United States Patent
Tamai

(10) Patent No.: US 9,351,286 B2
(45) Date of Patent: May 24, 2016

(54) WIRELESS AUDIO TRANSMISSION METHOD

(75) Inventor: Kazushi Tamai, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 144 days.

(21) Appl. No.: 13/996,310

(22) PCT Filed: Dec. 20, 2011

(86) PCT No.: PCT/JP2011/079477
§ 371 (c)(1),
(2), (4) Date: Jun. 20, 2013

(87) PCT Pub. No.: WO2012/086632
PCT Pub. Date: Jun. 28, 2012

(65) Prior Publication Data
US 2013/0286998 A1 Oct. 31, 2013

(30) Foreign Application Priority Data

Dec. 20, 2010 (JP) ................................. 2010-282897
Mar. 10, 2011 (JP) ................................. 2011-053116
Mar. 15, 2011 (JP) ................................. 2011-057065
Mar. 15, 2011 (JP) ................................. 2011-057066

(51) Int. Cl.
*H04W 74/04* (2009.01)
*H04W 72/04* (2009.01)
(Continued)

(52) U.S. Cl.
CPC ............ *H04W 72/04* (2013.01); *H04W 76/048* (2013.01); *H04W 72/12* (2013.01); *H04W 74/0808* (2013.01); *H04W 76/066* (2013.01)

(58) Field of Classification Search
CPC ............ H04W 72/04; H04W 74/0808; H04W 76/048; H04W 72/12; H04W 76/066
USPC ......................................................... 370/329
See application file for complete search history.

(56) References Cited

U.S. PATENT DOCUMENTS 5,448,750 A * 9/1995 Eriksson et al. ............ 455/452.2
6,084,919 A * 7/2000 Kleider et al. ................ 375/285
(Continued)

FOREIGN PATENT DOCUMENTS

CN 1728580 A 2/2006
JP 2001-332987 A 11/2001
(Continued)

OTHER PUBLICATIONS

International Search Report dated Mar. 19, 2012 w/partial English translation (five (5) pages).
(Continued)

*Primary Examiner* — Charles C Jiang
*Assistant Examiner* — Shah Rahman
(74) *Attorney, Agent, or Firm* — Crowell & Moring LLP

(57) ABSTRACT

In a wireless audio system in which both wireless audio signal transmission and communication using other wireless apparatuses are carried out, the transmitter and the receiver transmit audio packets by the following procedure using a plurality of communication channels shared with other wireless communication. The transmitter and the receiver select the same channel; after detecting that the channel has become idle, the transmitter stands by for only a stand-by time T1 shorter than the shortest packet space stipulated in the procedure of the other wireless communication and then transmits an audio packet; after the reception of the audio packet is completed, the receiver stands by for only a stand-by time T2 shorter than the shortest packet space and then returns a response signal. After the transmission/reception of a predetermined number of audio packets is completed, the transmitter and the receiver switch the communication channel and repeat the procedure.

20 Claims, 11 Drawing Sheets

(51) Int. Cl.
*H04W 76/04* (2009.01)
*H04W 76/06* (2009.01)
*H04W 72/12* (2009.01)
*H04W 74/08* (2009.01)

(56) References Cited

U.S. PATENT DOCUMENTS

| | | | |
|---|---|---|---|
| 6,983,164 B2 | 1/2006 | Kajimura | |
| 7,365,842 B2 | 4/2008 | Kitagawa | |
| 7,729,329 B2 | 6/2010 | Fujita et al. | |
| 7,925,269 B2* | 4/2011 | Shao et al. | 455/450 |
| 8,040,898 B2 | 10/2011 | Takizawa | |
| 8,149,795 B2* | 4/2012 | Kwon | H04J 3/1682 370/328 |
| 8,855,059 B2* | 10/2014 | Garudadri | H04L 29/06 370/329 |
| 2001/0023189 A1* | 9/2001 | Kajimura | 455/522 |
| 2003/0176194 A1* | 9/2003 | Farmer | H04M 1/72513 455/455 |
| 2004/0013168 A1* | 1/2004 | Haines et al. | 375/132 |
| 2006/0025136 A1* | 2/2006 | Fujita et al. | 455/436 |
| 2006/0079183 A1* | 4/2006 | Song et al. | 455/63.1 |
| 2006/0215593 A1* | 9/2006 | Wang | H04L 1/1874 370/315 |
| 2008/0123606 A1* | 5/2008 | Takizawa | 370/338 |
| 2008/0212582 A1* | 9/2008 | Zwart et al. | 370/390 |
| 2009/0247158 A1* | 10/2009 | Hara et al. | 455/434 |

FOREIGN PATENT DOCUMENTS

| | | | |
|---|---|---|---|
| JP | 2005-341415 A | | 12/2005 |
| JP | 2006-42076 A | | 2/2006 |
| JP | 2006-74374 A | | 3/2006 |
| JP | 2006074374 A | * | 3/2006 |
| JP | 2006-109448 A | | 4/2006 |
| JP | 2008-28430 A | | 2/2008 |
| JP | 2008028430 A | * | 2/2008 |
| JP | 2008-136018 A | | 6/2008 |
| JP | 2011-35464 A | | 2/2011 |

OTHER PUBLICATIONS

Japanese Office Action issued in Japanese Patent Application No. 2010-282897 dated Jul. 8, 2014 with English translation (seven pages).

Japanese Office Action issued in Japanese Patent Application No. 2011-053116 dated Jul. 8, 2014 with English translation (eight pages).

Japanese Office Action issued in Japanese Patent Application No. 2011-057065 dated Jul. 8, 2014 with English translation (eight pages).

Japanese Office Action issued in Japanese Patent Application No. 2011-053116 dated Feb. 10, 2015 with English translation (10 pages).

Chinese Office Action issued in Chinese U.S. Pat. No. 201180061640.8 dated Sep. 18, 2015 with English translation (11 pages).

* cited by examiner

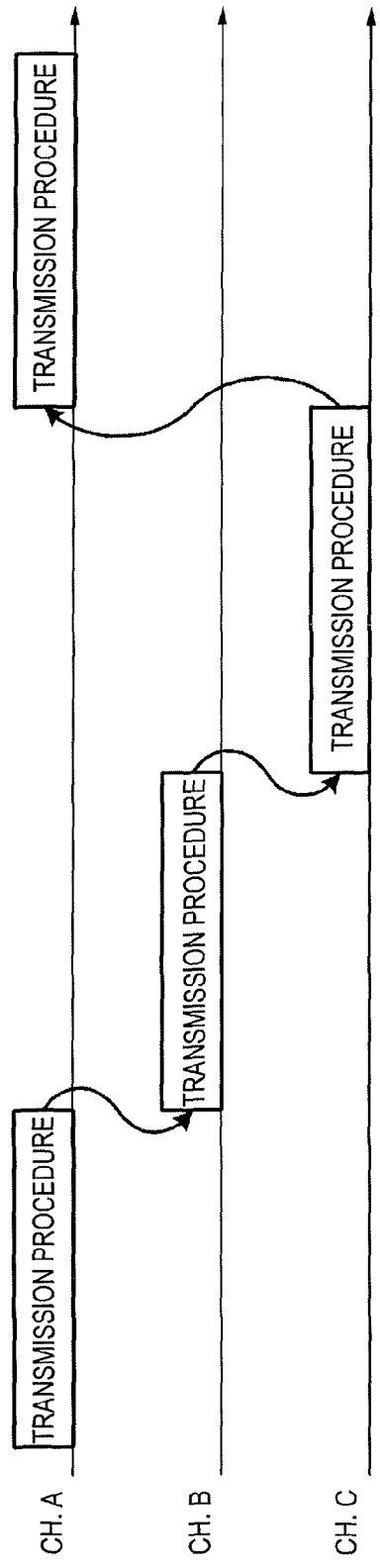
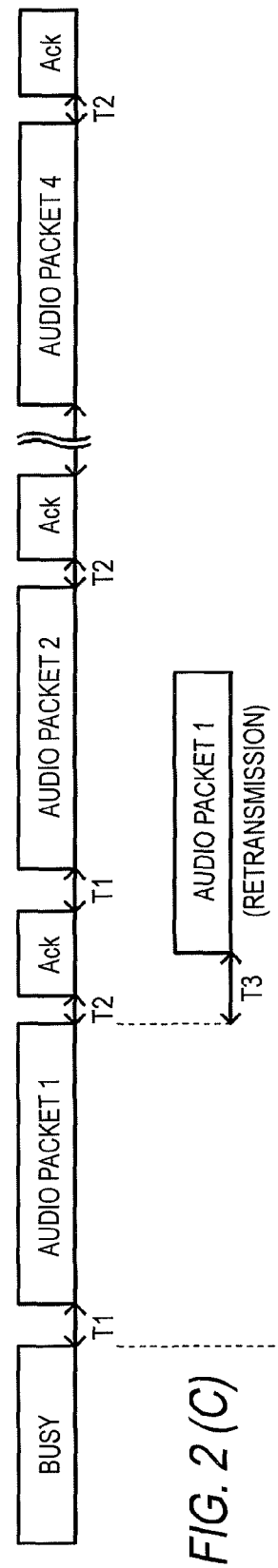
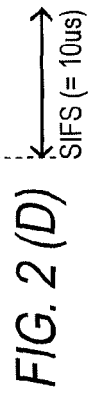

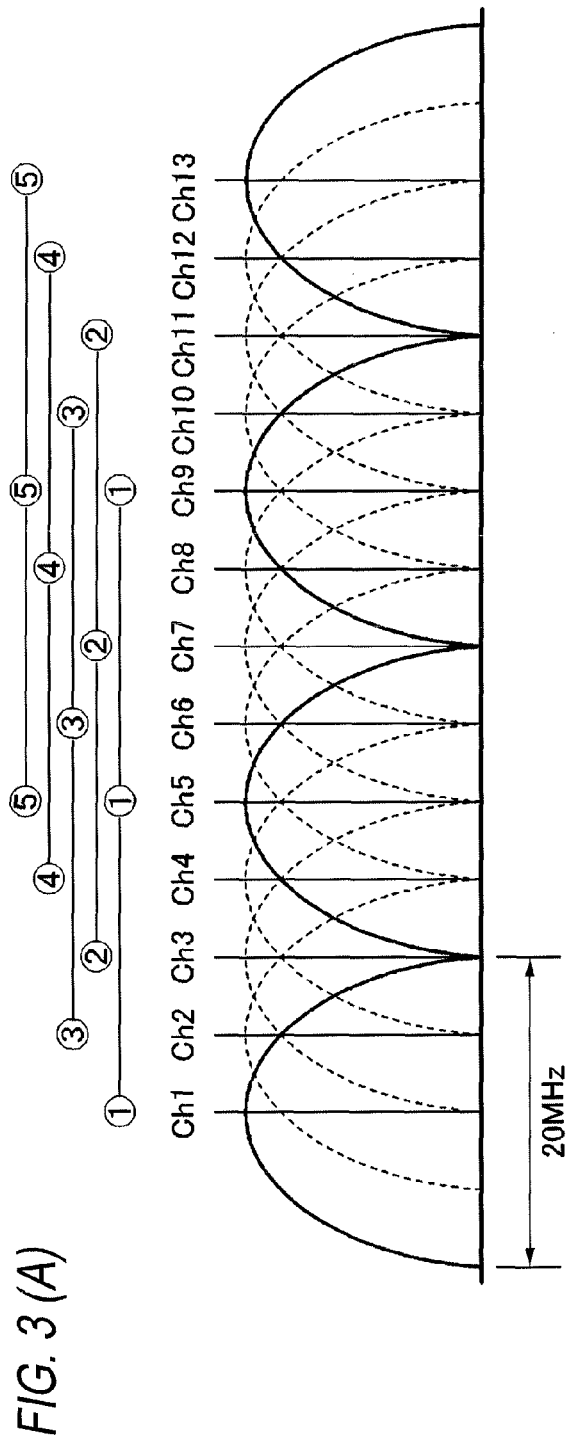
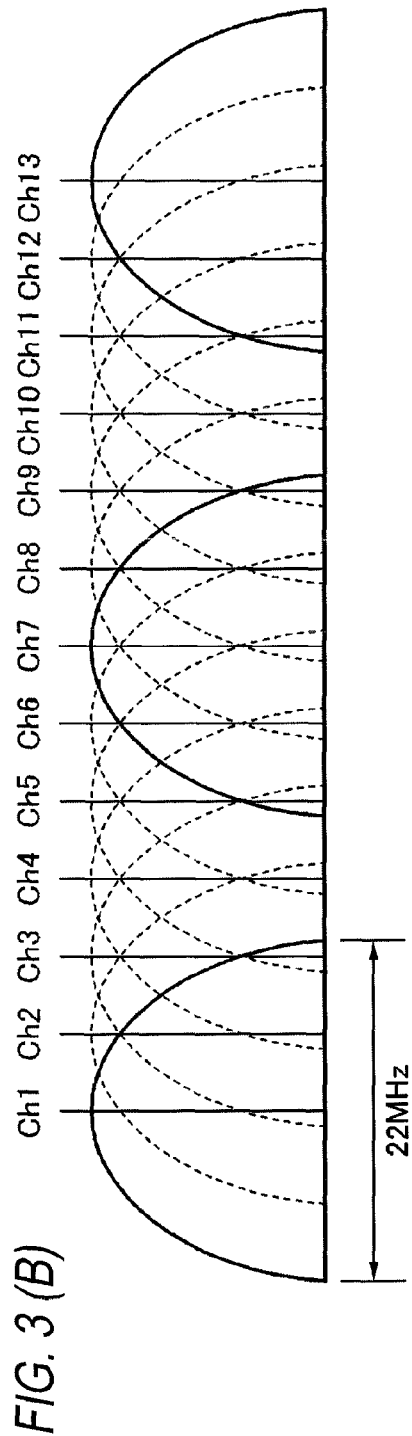
FIG. 3 (A)
FIG. 3 (B)

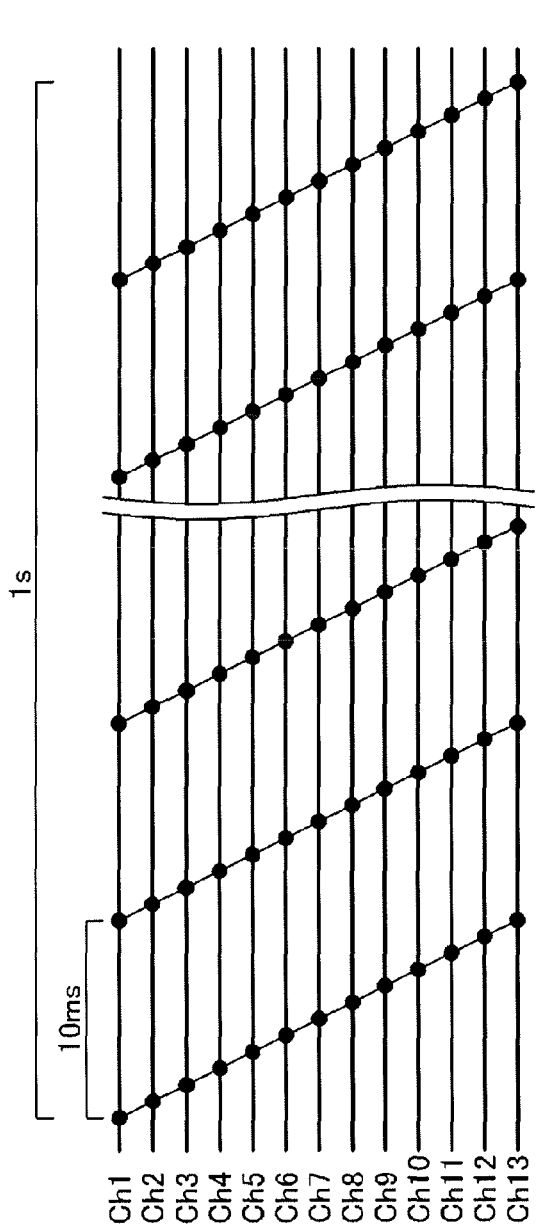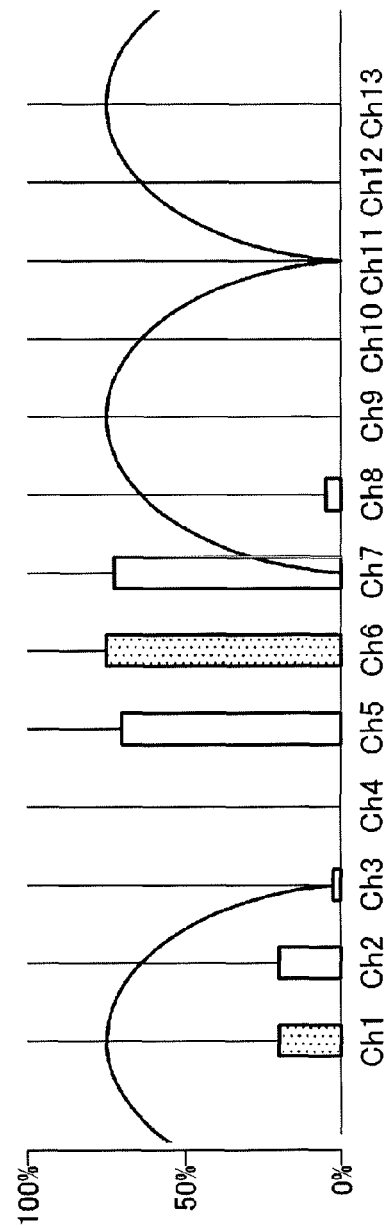
FIG. 5 (B)
FIG. 5 (C)

WIRELESS AUDIO TRANSMISSION METHOD

TECHNICAL FIELD

The present invention relates to a wireless audio transmission method for transmitting audio signals using radio waves.

BACKGROUND ART

In the audio field, transmitting audio signals using radio waves has been put to practical use because connecting a plurality of apparatuses using cables is burdensome or because cables are visually undesirable (for example, refer to JP-A-2006-074374). Frequency bands that can be used freely by consumer-oriented apparatuses for transmitting audio signals, for example, are limited, and not only apparatuses for transmitting audio signals but also various kinds of apparatuses, such as a wireless LAN, a cordless phone and a microwave oven, use a 2.4 GHz band.

SUMMARY OF THE INVENTION

Problem that the Invention is to Solve

However, since audio signal transmission is supposed to be performed continuously for a long time without intermission, if the audio signal transmission occupies a communication channel, other wireless apparatuses, such as an apparatus for wireless LAN communication, cannot make communication at all. Furthermore, conversely, if the priority of the audio signal transmission is lowered and higher priority is given to the wireless LAN communication, the audio signal transmission is apt to become intermittent, whereby there is a problem of generating noise in the audio signals reproduced on the receiving side.

Moreover, in the case that an apparatus other than a communication apparatus, such as a microwave oven, is used, errors may occur in audio signal transmission due to radio noise, whereby also in this case there is a problem of generating noise in the audio signals.

An object of the present invention is to provide a wireless audio transmission method in which both wireless audio signal transmission and communication using other wireless apparatuses are carried out.

Furthermore, an object of the present invention is to provide a wireless audio transmission method having high resistance to radio noise.

Means for Solving the Problem

In order to achieve the object, according to the invention, there is provided a wireless audio transmission method for transmitting audio packets through first wireless communication between a transmitter and a receiver using a plurality of channels shared with second wireless communication, the wireless audio transmission method comprising:

(step 1) by the transmitter and the receiver, selecting one channel;

(step 2) by the transmitter, performing carrier sense for the selected channel and detecting that the selected channel has become idle, and then;

(step 3) by the transmitter, standing by for only a first stand-by time shorter than a shortest packet space stipulated in a specification of the second wireless communication, and transmitting an audio packet;

(step 4) by the receiver, after completing reception of the audio packet, standing by for only a second stand-by time shorter than the shortest packet space, and transmitting a response signal;

(step 5) after receiving the response signal by the transmitter, when transmission/reception of a predetermined number of audio packets is not completed, returning to the step 3 to transmit a next audio packet; and (step 6) when the transmission/reception of the predetermined number of audio packets is completed, by the transmitter and the receiver, switching the selected channel and selecting another channel, and returning to the step 2.

According to the invention, there is provided a wireless audio transmission method for transmitting audio packets through first wireless communication between a transmitter and a receiver using a plurality of channels shared with second wireless communication, the wireless audio transmission method comprising:

(step 1) by the transmitter and the receiver, selecting one channel;

(step 2) by the transmitter, performing carrier sense for the selected channel and detecting that the selected channel has become idle, and then;

(step 3) by the transmitter, standing by for only a first stand-by time longer than SIFS which is a packet space for acknowledgement response stipulated in a specification of the second wireless communication and shorter than DIFS which is a shortest time of an ordinary packet space stipulated in the specification of the second wireless communication, and transmitting an audio packet;

(step 4) by the receiver, after completing reception of the audio packet, standing by for only a second stand-by time shorter than the SIFS, and transmitting a response signal;

(step 5) by the transmitter, after receiving the response signal, when transmission/reception of a predetermined number of audio packets is not completed, standing by for only a third stand-by time shorter than the SIFS, and transmitting an audio packet, and then returning to the step 4; and (step 6) when the transmission/reception of the predetermined number of audio packets is completed, by the transmitter and the receiver, switching the selected channel and selecting another channel, and returning to the step 2.

The plurality of channels shared with the second wireless communication may be a plurality of channels stipulated in IEEE 802.11b, and the switching of the selected channel may be performed among channels capable of being used simultaneously and having communication frequency bands not overlapped with one another in the plurality of channels.

In order to achieve the object, according to the invention, there is provided a wireless audio transmission method for transmitting audio packets through first wireless communication between a transmitter and a receiver using a plurality of channels shared with second wireless communication, the wireless audio transmission method comprising:

(step 1) by the transmitter, detecting usage state of each channel by scanning the plurality of channels and determining a plurality of assigned channels based on the usage state of each channel;

(step 2) by the transmitter, notifying the receiver of the determined plurality of assigned channels;

(step 3) by the transmitter and the receiver, selecting one assigned channel from among the plurality of assigned channels;

(step 4) by the transmitter, performing carrier sense for the selected assigned channel and detecting that the selected assigned channel has become idle, and then;

(step 5) by the transmitter, standing by for only a first stand-by time shorter than a shortest packet space stipulated in a specification of the second wireless communication, and transmitting an audio packet;

(step 6) by the receiver, after completing reception of the audio packet, standing by for only a second stand-by time shorter than the shortest packet space, and transmitting a response signal;

(step 7) by the transmitter, after completing transmission of the audio packet, when receiving no response signal from the receiver even after standing by for only a third stand-by time longer than the second stand-by time and shorter than the shortest packet space, retransmitting the audio packet;

(step 8) after receiving the response signal by the transmitter, when transmission/reception of a predetermined number of audio packets is not completed, returning to the step 5 to transmit a next audio packet; and (step 9) when the transmission/reception of the predetermined number of audio packets is completed, by the transmitter and the receiver, switching the selected assigned channel and selecting another assigned channel from among the plurality of assigned channels, and returning to the step 4.

According to the invention, there is provided a wireless audio transmission method for transmitting audio packets through first wireless communication between a transmitter and a receiver using a plurality of channels shared with second wireless communication, the wireless audio transmission method comprising:

(step 1) by the transmitter, detecting usage state of each channel by scanning the plurality of channels and determining a plurality of assigned channels based on the usage state of each channel;

(step 2) by the transmitter, notifying the receiver of the determined plurality of assigned channels, (step 3) by the transmitter and the receiver, selecting one assigned channel from among the plurality of assigned channels;

(step 4) by the transmitter, performing carrier sense for the selected assigned channel and detecting that the selected assigned channel has become idle, and then;

(step 5) by the transmitter, standing by for only a first stand-by time longer than SIFS which is a packet space for acknowledgement response stipulated in a specification of the second wireless communication and shorter than DIFS which is a shortest time of an ordinary packet space stipulated in the specification of the second wireless communication, and transmitting an audio packet;

(step 6) by the receiver, after completing reception of the audio packet, standing by for only a second stand-by time shorter than the SIFS, and transmitting a response signal;

(step 7) by the transmitter, after completing transmission of the audio packet, when receiving no response signal from the receiver even after standing by for only a third stand-by time longer than the second stand-by time and shorter than the SIFS, retransmitting the audio packet;

(step 8) by the transmitter, after receiving the response signal, when transmission/reception of a predetermined number of audio packets is not completed, standing by for only a fourth stand-by time shorter than the SIFS, transmitting an audio packet, and then returning to the step 6; and (step 9) when the transmission/reception of the predetermined number of audio packets is completed, by the transmitter and the receiver, switching the selected assigned channel and selecting another assigned channel from among the plurality of assigned channels, and returning to the step 4.

The predetermined number for each assigned channel may be further determined at the step 1 based on the usage state of each of the channels.

The steps 1 to 3 may be carried out again at a predetermined timing while the steps 4 to 9 are carried out repeatedly.

In order to achieve the object, according to the invention, there is provided a wireless audio transmission method for transmitting audio packets through first wireless communication between a transmitter and a receiver using a plurality of channels shared with second wireless communication, the wireless audio transmission method comprising:

(step 1) by the transmitter, selecting one from among a plurality of channel groups each of which includes at least two channels;

(step 2) by the transmitter, notifying the receiver of the selected channel group;

(step 3) by the transmitter and the receiver, selecting one channel from the selected channel group;

(step 4) by the transmitter, performing carrier sense for the selected channel and detecting that the selected channel has become idle, and then;

(step 5) by the transmitter, standing by for only a first stand-by time shorter than a shortest packet space stipulated in a specification of the second wireless communication, and transmitting an audio packet;

(step 6) by the receiver, after completing reception of the audio packet, standing by for only a second stand-by time shorter than the shortest packet space, and transmitting a response signal;

(step 7) by the transmitter, after completing transmission of the audio packet, when receiving no response signal from the receiver even after standing by for only a third stand-by time longer than the second stand-by time and shorter than the shortest packet space, storing information stating that an error has occurred, and retransmitting the audio packet;

(step 8) after receiving the response signal by the transmitter, when transmission/reception of a predetermined number of audio packets is not completed, returning to the step 5 to transmit a next audio packet;

(step 9) when the transmission/reception of the predetermined number of audio packets is completed, by the transmitter and the receiver, switching the selected channel and selecting another channel from the selected channel group, and returning to the step 4; and (step 10) monitoring the error, and, when an error rate of a channel included in the selected channel group exceeds a predetermined value, changing the selected channel group and selecting another channel group, and returning to the step 2.

The at least two channels included respectively in the plurality of channel groups may have frequency bands not overlapped with each other during audio packet transmission.

Another channel group to be selected at the step 10 may be a channel group not including a channel an error rate of which exceeds a predetermined value.

In a case that the transmitter transmits audio packets continuously a predetermined number of times without an error at the selected channel at the step 5, audio packet transmission may be performed while electric power is lowered.

According to the invention, there is provided a wireless audio transmission method for transmitting audio packets through first wireless communication between a transmitter and a receiver using a plurality of channels shared with second wireless communication, the wireless audio transmission method comprising:

(step 1) by the transmitter and the receiver, selecting one channel from among the plurality of channels;

(step 2) by the transmitter, performing carrier sense for the selected channel and detecting that the selected channel has become idle, and then;

(step 3) by the transmitter, standing by for only a first stand-by time shorter than a shortest packet space stipulated in a specification of the second wireless communication, and transmitting an audio packet;

(step 4) by the receiver, after completing reception of the audio packet, standing by for only a second stand-by time shorter than the shortest packet space, and transmitting a response signal;

(step 5) by the transmitter, after completing transmission of the audio packet, when receiving no response signal from the receiver even after standing by for only a third stand-by time longer than the second stand-by time and shorter than the shortest packet space, storing information stating that an error has occurred, and retransmitting the audio packet;

(step 6) after receiving the response signal by the transmitter, when transmission/reception of a predetermined number of audio packets is not completed, returning to the step 3 to transmit a next audio packet;

(step 7) when the transmission/reception of the predetermined number of audio packets is completed, by the transmitter and the receiver, switching the selected channel and selecting another channel from among the plurality of channels, and returning to the step 2; and (step 8) determining the predetermined number at each channel based on an error rate of each channel of the plurality of channels at a predetermined timing while carrying out the steps 2 to 7 repeatedly.

In a case that the transmitter transmits audio packets continuously a predetermined number of times without an error at the selected channel at the step 3, audio packet transmission may be performed while electric power is lowered.

The first stand-by time may be longer than Short Inter Frame Space (SIFS) stipulated in IEEE 802.11b and shorter than Distributed Inter Frame Space (DIFS) stipulated in the IEEE 802.11b, and the second stand-by time may be shorter than the SIFS, and the third stand-by time is longer than the second stand-by time and shorter than the SIFS.

In order to achieve the object, according to the invention, there is provided a wireless audio transmission method for transmitting audio packets through first wireless communication between a transmitter and a receiver using a plurality of channels shared with second wireless communication, the wireless audio transmission method comprising:

(step 1) by the transmitter and the receiver, selecting one assigned channel from among a plurality of assigned channels;

(step 2) by the transmitter, performing carrier sense for the selected assigned channel, storing a busy rate of the selected assigned channel, and detecting that the selected assigned channel has become idle, and then;

(step 3) by the transmitter, standing by for only a first stand-by time shorter than a shortest packet space stipulated in a specification of the second wireless communication, and transmitting an audio packet;

(step 4) by the receiver, after completing reception of the audio packet, standing by for only a second stand-by time shorter than the shortest packet space, and transmitting a response signal;

(step 5) by the transmitter, after completing transmission of the audio packet, when receiving no response signal from the receiver even after standing by for only a third stand-by time longer than the second stand-by time and shorter than the shortest packet space, retransmitting the audio packet;

(step 6) after receiving the response signal by the transmitter, when transmission/reception of a predetermined number of audio packets is not completed, returning to the step 3 to transmit a next audio packet;

(step 7) when the transmission/reception of the predetermined number of audio packets is completed, by the transmitter and the receiver, switching the selected assigned channel and selecting another assigned channel from among the plurality of assigned channels, and returning to the step 2; and (step 8) determining the predetermined number at each assigned channel based on the stored busy rate of each assigned channel at a predetermined timing while carrying out the steps 2 to 7 repeatedly.

According to the invention, there is provided a wireless audio transmission method for transmitting audio packets through first wireless communication between a transmitter and a receiver using a plurality of channels shared with second wireless communication, the wireless audio transmission method comprising:

(step 1) by the transmitter and the receiver, selecting one assigned channel from among a plurality of assigned channels;

(step 2) by the transmitter, performing carrier sense for the selected assigned channel, storing a busy rate of the selected assigned channel, and detecting that the selected assigned channel has become idle, and then;

(step 3) by the transmitter, standing by for only a first stand-by time longer than SIFS which is a packet space for acknowledgement response stipulated in a specification of the second wireless communication and shorter than DIFS which is a shortest time of an ordinary packet space stipulated in the specification of the second wireless communication, and transmitting an audio packet;

(step 4) by the receiver, after completing reception of the audio packet, standing by for only a second stand-by time shorter than the SIFS, and transmitting a response signal;

(step 5) by the transmitter, after completing transmission of the audio packet, when receiving no response signal from the receiver even after standing by for only a third stand-by time longer than the second stand-by time and shorter than the SIFS, retransmitting the audio packet;

(step 6) after receiving the response signal by the transmitter, when transmission/reception of a predetermined number of audio packets is not completed, standing by for only a fourth stand-by time shorter than the SIFS, and transmitting an audio packet, and then returning to the step 4;

(step 7) when the transmission/reception of the predetermined number of audio packets is completed, by the transmitter and the receiver, switching the selected assigned channel and selecting another assigned channel from among the plurality of assigned channels, and returning to the step 2; and (step 8) determining the predetermined number at each assigned channel based on the stored busy rate of each assigned channel at a predetermined timing while carrying out the steps 2 to 7 repeatedly.

Before the step 1 is carried out, the transmitter may detect usage state of each channel by scanning the plurality of channels, and determine the plurality of assigned channels based on the usage state of each channel, and the transmitter may notify the receiver of the determined plurality of assigned channels.

BRIEF DESCRIPTION OF THE DRAWINGS

FIGS. 2(A), 2(B), 2(C) and 2(D) are views illustrating a procedure for transmitting audio packets in the wireless audio system;

FIGS. 3(A) and 3(B) are views illustrating a plurality of communication channels stipulated in the IEEE 802.11b and illustrating channels used by the wireless audio system;

MODE FOR CARRYING OUT THE INVENTION

Figure 1:
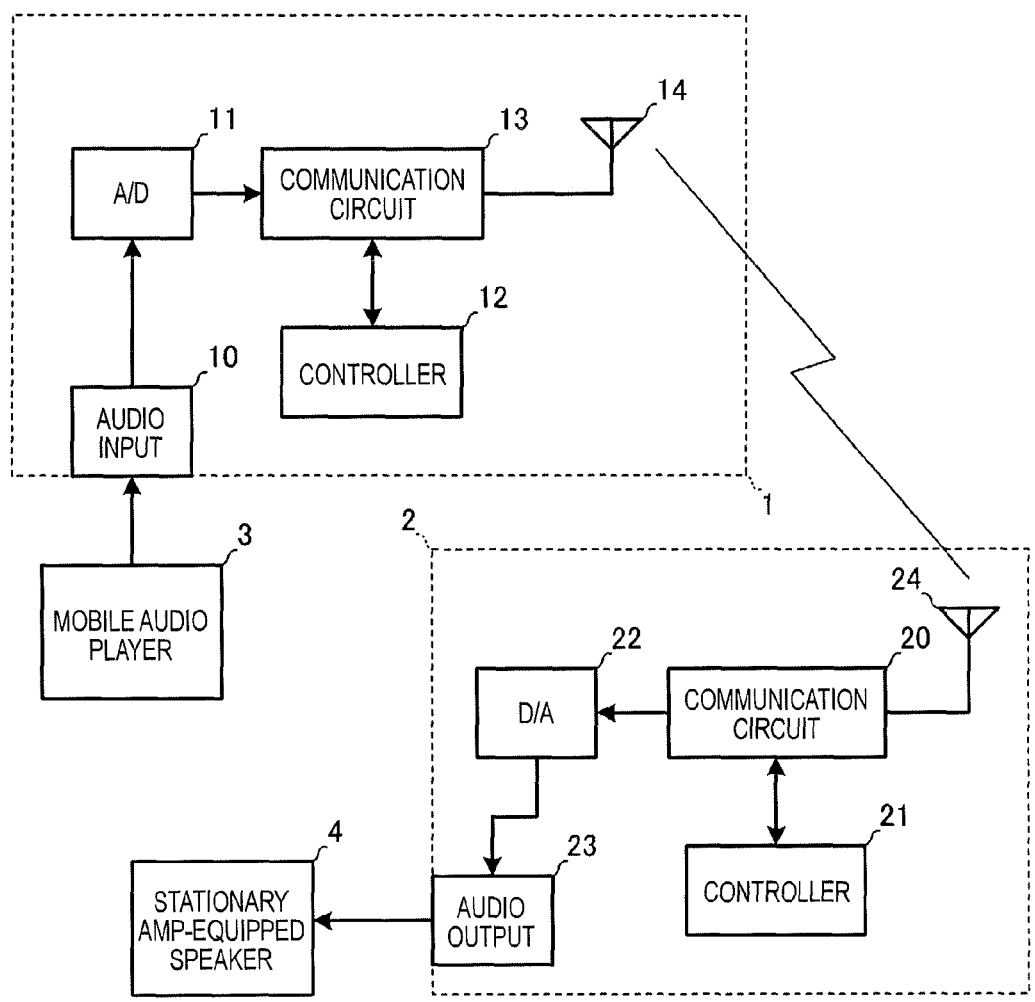
FIG. 1 is a configuration view showing a wireless audio system according to first to fourth embodiments of the present invention.

First to fourth embodiments according to the present invention will be described below referring to the drawings.

As shown in FIG. 1, this wireless audio system is composed of a transmitter 1, a receiver 2, a mobile audio player 3 connected to the transmitter 1, and a stationary amp-equipped speaker 4 connected to the receiver 2. The transmitter 1 digitizes the audio signal reproduced and input from the mobile audio player 3 and transmits the signal on a 2.4-GHz band quasi-microwave. The receiver 2 receives the high-frequency signal transmitted from the transmitter 1, D/A converts the audio signal superimposed on the high-frequency signal, and inputs the signal to the amp-equipped speaker 4. The digitized audio signal is transmitted from the transmitter 1 to the receiver 2 unidirectionally at high speed, and control signals, such as commands, are bidirectionally transmitted at low speed between the transmitter 1 and the receiver 2.

The communication between the transmitter 1 and the receiver 2 is performed while channel movement is performed among the 13 channels stipulated by the IEEE 802.11b. When transmission/reception (transmission) of a predetermined number of audio packets is completed at any one of the channels, channel movement is performed, and the transmission of the next predetermined number of audio packets is performed at the moved channel. By the repetition of this procedure, audio packets are transmitted without intermission, and a situation in which communication at a specific channel is impossible is prevented even if a wireless LAN system conforming to the IEEE 802.11b is located within the range of radio wave transmission,

First Embodiment

The first embodiment will be described below.

First, the audio packet transmission procedure in this wireless audio system is described referring to FIGS. 2(A) to 2(D). The transmitter 1 and the receiver 2 start audio packet transmission at the same channel (Ch. A) that is determined by a negotiated or preset schedule. Then, as described above, the transmitter 1 and the receiver 2 perform audio packet transmission while channel movement is performed sequentially among a plurality of channels (Ch. A, B, C) as shown in FIG. 2(A).

The audio packet transmission procedure in each channel is described referring to FIG. 2(B). When starting audio packet transmission at a certain channel, the transmitter 1 first performs carrier sense and monitors whether a state (BUSY) in which another communication apparatus is transmitting a signal is ended and the state is changed to idle. When the state of the channel has been changed to idle, the transmitter stands by for a stand-by time T1 (for example, 3 μs) thereafter and then starts audio packet transmission. After the state of the channel has been changed to idle, a wireless LAN terminal conforming to the IEEE 802.11b stands by for 10 μs (SIFS: Short Inter Frame Space (refer to FIG. 2(D)) at the shortest and usually stands by for 50 μs or more (DIFS: DCF Inter Frame Space+back-off time) and then starts packet transmission; hence, the transmitter 1 can certainly transmits an audio packet without lagging behind the wireless LAN terminal. This audio packet is received by the receiver 2.

When the transmission of the audio packet is ended, an acknowledgement response ACK is transmitted from the receiver 2. The stand-by time T2 from the completion of packet reception to the transmission of the acknowledgement response ACK at the receiver 2 is 2 μs, for example. Also in this case, in a similar way as described above, the receiver can transmit the acknowledgement response ACK earlier than the wireless LAN terminal.

Furthermore, as shown in FIG. 2(C), in the case that the transmitter 1 cannot receive the acknowledgement response ACK even after standing by for T3 (for example, 5 μs) after the transmission of the audio packet, the transmitter 1 retransmits the same audio packet. Since this stand-by time T3 is also shorter than the shortest packet space (SIFS) of the wireless LAN, the audio packet can be retransmitted without being interrupted by the wireless LAN terminal. The size of one audio packet is approximately 500 μs, and with this size, audio data of approximately 1 ms can be transmitted. Hence, even if retransmission occurs once in several times, buffer underflow does not occur on the side of the receiver 2.

The reason why the packet transmission can be started even though the stand-by time is short as described above is that the wireless audio system is not intended for long-distance communication, for example, for use in wireless LAN communication, but intended for packet transmission in a short distance of approximately 10 m. If the stand-by time is extended longer, it is possible to increase the distance margins among the devices of the wireless audio system and to increase the throughput margins of high-frequency circuits and processing sections as a matter of course.

In the description of this figure, the stand-by times T1, T2 and T3 are all made shorter than the SIFS (10 μs); however, even if the stand-by times T1, T2 and T3 are longer than the SIFS, if they are shorter than the shortest time (50 μs) of the DIFS, communication is possible without being interrupted by the wireless LAN. In this case, the transmission of the acknowledgement response ACK (standing by for 10 μs) of the wireless LAN (IEEE 802.11b) has priority over the start of the audio packet transmission in the wireless audio system (T1>10 μs). After waiting for the completion of a series of packet transmission steps for the packet transmission and the return of the acknowledgement response in the wireless LAN, the wireless audio system starts audio packet transmission. This method slightly delays the start of audio packet transmission; however, in consideration of the efficiency of the overall wireless communication environment, it may be said that this method provides higher efficiency. Moreover, it may be possible to make transmission efficient by making only the stand-by time T1 immediately after Busy in FIG. 2(B) longer than the SIFS (10 s) so that priority is given to the transmission of the acknowledgement response of the wireless LAN and by making the subsequent stand-by times T1, T2 and T3 shorter than the SIFS. In the case that the specifications of another type of wireless communication sharing a plurality of communication channels with the wireless communication according to the present invention conform to the IEEE 802.11b, the SIFS or the shortest time of DIFS can be applied to the shortest packet space according to the present invention.

In this procedure, when the transmitter 1 and the receiver 2 transmit audio packets, the audio packets are transmitted in priority over the packets of the wireless LAN at all times and sound loss does not occur; however, if this is performed continuously for a long time, the communication of the wireless LAN system cannot be performed at all at this channel (for example, Ch. A). Hence, after the transmission of a predetermined number (for example, four) of audio packets is completed, the channel is moved to another channel (for example, Ch. B) and audio packet transmission is performed continuously using a similar procedure. Similarly, after the transmission of a predetermined number of audio packets is completed at this channel, the channel is moved to still another channel (for example, Ch. C) and audio packet transmission is further performed continuously using a similar procedure. As a result, the influence on the wireless LAN is minimized while audio packet transmission is performed continuously without intermission.

The 13 channels stipulated in the IEEE 802.11b and the channels (Ch. A, B, C) used by this wireless audio system will be herein described referring to FIGS. 3(A) and 3(B). The 13 channels are set at intervals of 5 MHz from 2412 MHz to 2472 MHz. In the case that the communication bandwidth is 20 MHz, four channels Ch1, Ch5, Ch9 and Ch13 can be used simultaneously as indicated by the solid lines in FIG. 3(A). Hence, in the case that the transmission bandwidth of the wireless audio system (the transmitter 1) is 20 MHz, audio packets can be transmitted at only one occupied channel while the other three channels are made usable simultaneously by sequentially performing channel movement among Ch1, Ch5, Ch9 and Ch13.

Furthermore, in the case that the transmission bandwidth is 22 MHz, three channels can be used simultaneously. Various combinations, such as the combination of Ch1, Ch6 and Ch11, other than the combination of Ch1, Ch7 and Ch13 indicated by the solid lines in FIG. 3(B) are possible as the combination of the three channels. Hence, in the case that the transmission bandwidth of the wireless audio system (the transmitter 1) is 22 MHz, audio packets can be transmitted at only one occupied channel while the other two channels are made usable simultaneously by sequentially performing channel movement among the channels of the above-mentioned combination.

However, the pattern of channel movement according to the present invention is not limited to those described above.

Referring again to FIG. 1, the configurations of the transmitter 1 and the receiver 2 will be described. The transmitter 1 is equipped with an audio input section 10 to which the mobile audio player 3 is connected, an A/D converter 11 for converting an audio signal input from the mobile audio player 3 into a digital signal, a controller 12 for controlling the operation of the transmitter 1, a communication circuit 13 for performing communication at various communication channels, and an antenna 14. The communication circuit 13 transmits an audio signal and receives an acknowledgement response ACK from the receiver 2. In addition, the communication circuit performs communication so that the communication channel is switched in synchronization with the switching in the receiver 2. The controller 12 performs channel switching on the basis of the negotiation with the receiver 2 or a schedule.

The receiver 2 has a built-in antenna 24, a communication circuit 20 for performing communication at respective communication channels, a controller 21 for controlling the operation of the receiver 2, a D/A converter 22 for converting a received digital audio signal into an analog signal, and an audio output section 23 for outputting an audio signal to the amp-equipped speaker 4. The communication circuit 20 receives a high-frequency signal transmitted from the transmitter 1, demodulates the audio signal and control signals, and transmits signals, such as an acknowledgement response ACK, input from the controller 21 to the transmitter 1. The audio signal demodulated to a base band digital signal by the communication circuit 20 is input to the D/A converter 22. In addition, the control signals demodulated by the communication circuit 20 are input to the controller 21. The D/A converter 22 converts the input digital audio signal into an analog audio signal and outputs the signal from the audio output section 23 to the amp-equipped speaker 4.

Figure 4:
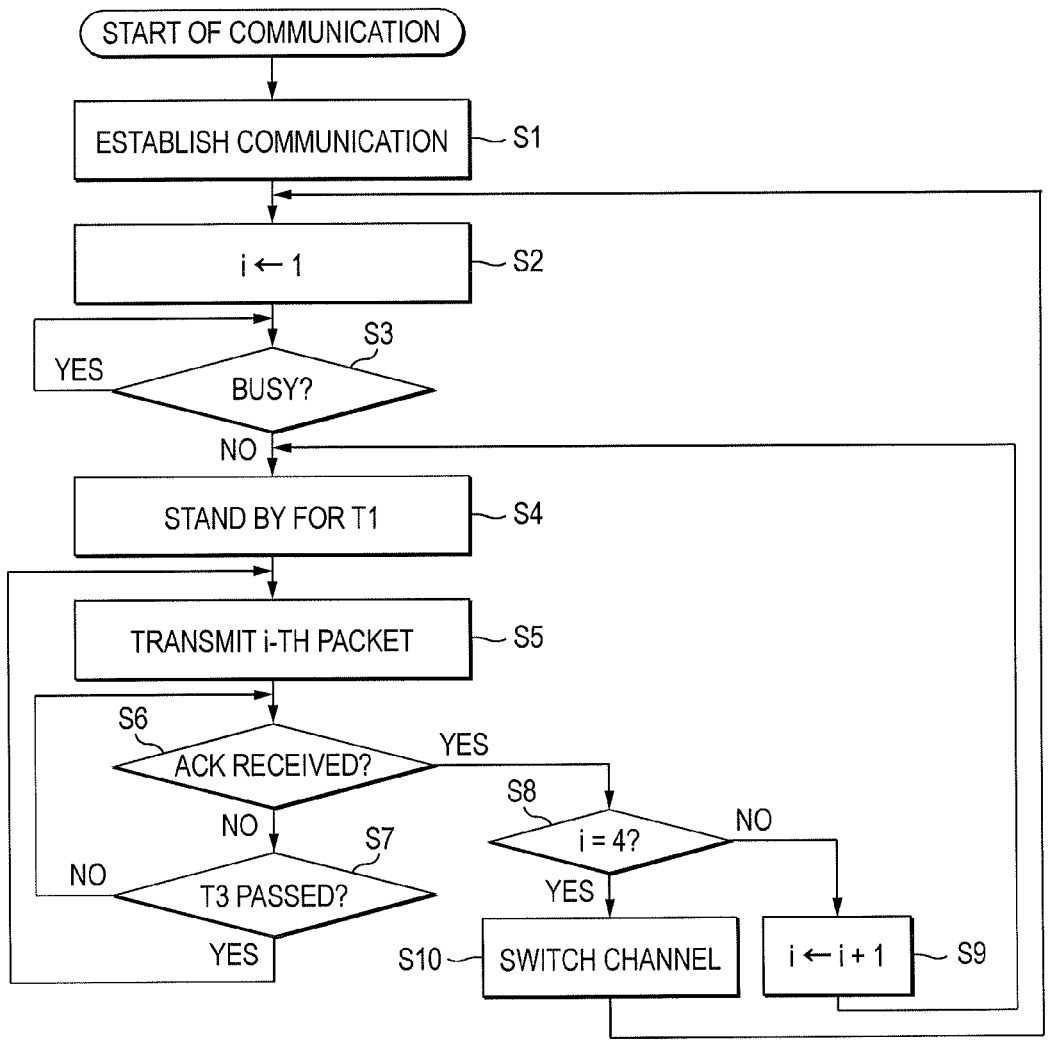
FIG. 4 is a flow chart showing the operation of the transmitter of the wireless audio system according to the first embodiment.

FIG. 4 is a flow chart showing the operation of the controller 12 of the transmitter 1. When communication with the receiver 2 is established at a certain communication channel (at S1), the following processing is started. First, 1 is set in a counter i for counting the number of packets to be transmitted at this channel (at S2). Then, the controller judges whether the channel is busy by performing carrier sense (at S3). The controller stands by at S3 until the busy state of the channel is ended; when the state is changed to idle (NO at S3), the controller stands by for only the stand-by time T1 (at S4) and transmits an i-th audio packet (at S5). It is assumed that carrier sense is performed at the communication channel even during the stand-by time T1.

After the transmission of the audio packet is ended, the controller stands by for T3 until an acknowledgement response ACK is received from the receiver 2 (at S6 and S7). When the acknowledgement response ACK is received until T3 has passed (YES at S6), a judgment is made as to whether the packet number counter i is 4 (at S8). In the case that the packet number counter i is less than 4 (NO at S8), 1 is added to i (at S9), and the controller returns to S4 and transmits the next audio packet.

On the other hand, at S6 and S7, in the case that the acknowledgement response ACK is not received from the receiver 2 even after the stand-by time T3 has passed (YES at S7), the controller returns to S5 and retransmits the i-th audio packet.

In the case that the packet number counter i is 4 at S8 (YES at S8), the controller determines that audio packet transmission at this channel is ended, switches the communication channel in synchronization with the switching in the receiver 2 (at S10) and then returns to S2 and starts audio packet transmission at this channel.

Second Embodiment

The second embodiment will be described below.

In the second embodiment, the schedule regarding which channel is used and how many packets are transmitted at each channel is determined beforehand on the basis of channel scanning that is performed beforehand.

First, the audio packet transmission procedure in this wireless audio system is described referring to FIGS. 2(A) to 2(D).

The transmitter 1 and the receiver 2 start audio packet transmission at a first channel (Ch. A) that is determined by a schedule determined by channel scanning. Then, the transmitter 1 and the receiver 2 perform audio packet transmission while channel movement is performed sequentially among a plurality of channels (Ch. A, B, C) determined by the schedule as shown in FIG. 2(A).

The audio packet transmission procedure in each channel is described referring to FIG. 2(B). When starting audio packet transmission at a certain channel, the transmitter 1 first performs carrier sense and monitors whether a state (BUSY) in which another communication apparatus is transmitting a signal is ended and the state is changed to idle. When the state of the channel has been changed to idle, the transmitter stands by for a stand-by time T1 (for example, 3 μs) after the change and then starts audio packet transmission. In the case that the above-mentioned other communication apparatus is a wireless LAN terminal conforming to the IEEE 802.11b, after the state of the channel has been changed to idle, the terminal stands by for 10 μs (SIFS: Short Inter Frame Space (refer to FIG. 2(D)) at the shortest and usually stands by for 50 μs or more (DIFS: DCF Inter Frame Space+back-off time) and then starts packet transmission. Hence, the transmitter 1 can certainly transmits an audio packet without allowing the wireless LAN terminal to start communication. This audio packet is received by the receiver 2.

When the transmission of the audio packet is ended, an acknowledgement response ACK is transmitted from the receiver 2. The stand-by time T2 from the completion of packet reception to the transmission of the acknowledgement response ACK at the receiver 2 is 2 μs, for example. Also in this case, in a similar way as described above, the receiver can transmit the acknowledgement response ACK earlier than the wireless LAN terminal.

Furthermore, as shown in FIG. 2(C), in the case that the transmitter 1 cannot receive the acknowledgement response ACK even after standing by for T3 (for example, 5 μs) after the transmission of the audio packet, the transmitter 1 retransmits the same audio packet. Since this stand-by time T3 is also shorter than the shortest packet space (SIFS) of the wireless LAN, the audio packet can be retransmitted without being interrupted by the wireless LAN terminal. The size of one audio packet is approximately 500 μs, and with this size, audio data of approximately 1 ms can be transmitted. Hence, even if retransmission occurs once in several times, buffer underflow does not occur on the side of the receiver 2.

The reason why the packet transmission can be started even though the stand-by time is short as described above is that the wireless audio system is not intended for long-distance communication, for example, for use in wireless LAN communication, but intended for packet transmission in a short distance of approximately 10 m. If the stand-by time is extended longer, it is possible to increase the distance margins among the devices of the wireless audio system and to increase the throughput margins of high-frequency circuits and processing sections as a matter of course.

In the description of this figure, the stand-by times T1, T2 and T3 are all made shorter than the SIFS (10 μs); however, even if the stand-by times T1, T2 and T3 are longer than the SIFS, if they are shorter than the shortest time (50 μs) of the DIFS, communication is possible without being interrupted by the other wireless LAN. In the case that the transmission of the acknowledgement response ACK (standing by for 10 μs) of the wireless LAN (IEEE 802.11b) is placed so as to have priority over the start of the audio packet transmission in the wireless audio system (T1>10 μs) as described above, the wireless audio system waits for the completion of a series of packet transmission steps for the packet transmission and the return of the acknowledgement response in the wireless LAN, and then starts audio packet transmission, whereby the start of audio packet transmission is delayed slightly; however, in consideration of the efficiency of the overall wireless communication environment, it may be said that higher efficiency is obtained in the case that priority is placed on the acknowledgement response ACK of the other wireless LAN terminal and that the execution of the series of packet transmission steps is completed as described above. Moreover, it may be possible to make transmission efficient by making only the stand-by time T1 immediately after Busy in FIG. 2(B) longer than the SIFS (10 μs) so that priority is given to the transmission of the acknowledgement response of the wireless LAN and by making the subsequent stand-by times T1, T2 and T3 shorter than the SIFS. In the case that the specifications of another type of wireless communication sharing a plurality of communication channels with the wireless communication according to the present invention conform to the IEEE 802.11b, the SIFS or the shortest time of DIFS can be applied to the shortest packet space according to the present invention.

In this procedure, when the transmitter 1 and the receiver 2 transmit audio packets, the audio packets are transmitted in priority over the packets of the wireless LAN at all times and sound loss does not occur; however, if this is performed continuously for a long time, the communication of the wireless LAN system cannot be performed at all at this channel (for example, Ch. A). Hence, after the transmission of a predetermined number (for example, three to six) of audio packets, having been determined on the basis of the result of the channel scanning, is completed, the channel is moved to another channel (for example, Ch. B) and audio packet transmission is performed continuously using a similar procedure. Similarly, after the transmission of a predetermined number of audio packets is completed at this channel, the channel is moved to still another channel (for example, Ch. C) and audio packet transmission is further performed continuously using a similar procedure. As a result, the influence on the wireless LAN is minimized while audio packet transmission is performed continuously without intermission.

The 13 channels stipulated in the IEEE 802.11b will be herein described referring to FIGS. 3(A) and 3(B). The 13 channels are set at intervals of 5 MHz from 2412 MHz to 2472 MHz. In the case that the communication bandwidth is 20 MHz, four channels Ch1, Ch5, Ch9 and Ch13 can be used simultaneously as indicated by the solid lines in FIG. 3(A). Furthermore, in the case that the transmission bandwidth is 22 MHz, three channels can be used simultaneously. Although the combination of three channels Ch1, Ch7 and Ch13 is indicated by the solid lines in FIG. 3(B), various combinations, such as the combination of Ch1, Ch6 and Ch11, other than the above-mentioned combination are possible.

In the case that other wireless communication, such as wireless LAN, is not performed at all, audio packet transmission can be performed using such basic combinations as shown in FIGS. 3(A) and 3(B). However, in the case that other wireless communication is performed using this frequency band, for the purpose of minimizing influence on the other wireless communication, the usage state of each channel is checked before the start of communication, a channel that is less influenced even if packet transmission is performed preferentially is selected as an assigned channel, and audio packet transmission is performed using this assigned channel. Furthermore, the number of packets to be transmitted at one time at each assigned channel is determined depending on the congestion state of the communication bandwidth (channel bandwidth) in each assigned channel.

A method for determining assigned channels and the number of packets to be transmitted at one time at each assigned channel (schedule) will be described below referring to FIGS. 5(A) to (C). In the following embodiments, a case in which the transmission bandwidth is 20 MHz and three assigned channels are selected is described.

Figure 5:
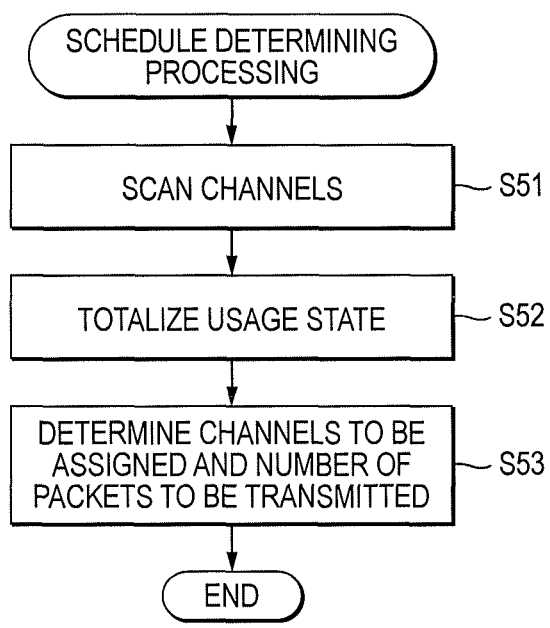
FIGS. 5(A), 5(B) and 5(C) are views illustrating a method for determining the schedule of the wireless audio system.

FIG. 5(A) is a flow chart showing a schedule determination processing operation. This processing is carried out by the controller 12 described later. In this processing, the controller scans all the 13 channels in the 2.4 GHz band (at S51) and totalizes the usage state information of the respective channels according to the result of the scanning (at S52). Then, the controller determines channels (assigned channel) to be used for packet transmission and the number of packets to be transmitted at one time at each assigned channel on the basis of the result of the totalization (at S53).

A method for performing channel scanning and a method for totalizing the usage state information are described referring to FIGS. 5(B) and 5(C). The controller performs carrier sense by scanning channels 1 to 13 and detects whether each channel is busy (used) or idle (not used). This is repeated a plurality of times (for example, 100 times) at regular intervals (for example, every 10 ms). The time required for the scanning is 1 second in the case that the scanning is repeated 100 times in every 10 ms. The non-instantaneous average usage state of each channel can be detected by repeating the busy/idle scanning for all the channels. A large part of the time required for the channel scanning is spent for the receiver channel switching (received frequency switching) of the communication circuit 13. If a receiver capable of performing high-speed channel switching can be realized, the time for the above-mentioned channel scanning can be shortened significantly.

After the plurality of times of the scanning, the number of busy times (busy state frequency) is totalized for each channel. FIG. 5(C) is a graph showing the distribution of the busy state frequency. In the case that the scanning is repeated 100 times, the busy state frequency (number of times) represents a busy rate (%). In the example shown in the figure, communication is performed using channel 1 and channel 6, and the busy rate of channel 6 has a high rate of approximately 60%. The channel band for this communication ranges from channel 5 to channel 7. Furthermore, the busy rate of channel 1 is approximately 20%, and the channel band for this communication ranges from channel 1 to channel 2.

In addition, the channel band for packet transmission is applied to this frequency distribution graph and three channels having less influence are determined as assigned channels. In the example of FIG. 5(C), channel 13 and channel 9 having almost no influence on the channels being used at present are determined as first and second assigned channels C(1) and C(2), and the channel 1 having no influence on channel 6 being used at the high busy rate and having influence on channel 1 being used at the low busy rate is determined as a third assigned channel C(3).

Next, the number of packets to be transmitted in one turn at each assigned channel is determined. In this embodiment, the number of packets is distributed to the respective assigned channels so that a channel with a lower busy rate transmits more packets and so that 15 packets can be transmitted while the three assigned channels are used sequentially. The numbers p(1), p(2) and p(3) of packets to be transmitted at the assigned channels C(1), C(2) and C(3) are, for example:

$$p(1) = \text{int}\left(\frac{r1}{r1+r2+r3} \times 6\right) + 3 \quad \text{[Mathematical expression 1]}$$

$$p(2) = \text{int}\left(\frac{r2}{r1+r2+r3} \times 6\right) + 3$$

$$p(3) = \text{int}\left(\frac{r3}{r1+r2+r3} \times 6\right) + 3$$

calculated by the above mathematical expression, wherein $r1$=[idle rate of channel $C(1)$]−50

$r2$=[idle rate of channel $C(2)$]−50

$r3$=[idle rate of channel $C(3)$]−50

The idle rate is calculated by "100−busy rate." When r1, r2 and r3 become negative, they should only be set to 0. Furthermore, the total of p(1), p(2) and p(3) becomes more than or less than 15 in some cases depending on int rounding processing; in such a case, adjustment should only be performed by increasing or decreasing the largest value p(n). In the present invention, the number of the assigned channels is not limited to three.

The allocation of the number of transmission packets depending on the congestion of the channel band of each assigned channel is determined by the above-mentioned processing. However, the method for determining the number of transmission packets is not limited to this method. In addition, instead of changing the allocation depending on the busy rate, for example, as shown below:

$p(1)$=7, $p(2)$=5, $p(3)$=3 the number of packets may be allocated fixedly in the order of the assigned channels. Furthermore, the number of packets may be allocated equally to all the assigned channels regardless of the busy rate (without detecting the busy rate).

Referring again to FIG. 1, the configurations of the transmitter 1 and the receiver 2 will be described. The transmitter 1 is equipped with an audio input section 10 to which the mobile audio player 3 is connected, an A/D converter 11 for converting an audio signal input from the mobile audio player 3 into a digital signal, a controller 12 for controlling the operation of the transmitter 1, a communication circuit 13 for performing communication at various communication channels, and an antenna 14. The communication circuit 13 transmits an audio signal and receives an acknowledgement response ACK from the receiver 2. Furthermore, the communication circuit 13 performs intercommunication of control signals, such as the transmission/reception of the schedule, with the receiver 2. Moreover, the communication circuit 13 watches the communication channel and performs busy/idle check. The channel switching of the communication circuit 13 is performed under the control of the controller 12.

The receiver 2 has a built-in antenna 24, a communication circuit 20 for performing communication at respective communication channels, a controller 21 for controlling the operation of the receiver 2, a D/A converter 22 for converting a received digital audio signal into an analog signal, and an audio output section 23 for outputting an audio signal to the amp-equipped speaker 4. The communication circuit 20 receives a high-frequency signal transmitted from the transmitter 1, demodulates the audio signal and control signals, and transmits signals, such as an acknowledgement response ACK, input from the controller 21 to the transmitter 1. The audio signal demodulated to a base band digital signal by the communication circuit 20 is input to the D/A converter 22. In addition, the control signals demodulated by the communication circuit 20 are input to the controller 21. The D/A converter 22 converts the input digital audio signal into an analog audio signal and outputs the signal from the audio output section 23 to the amp-equipped speaker 4.

Figure 6:
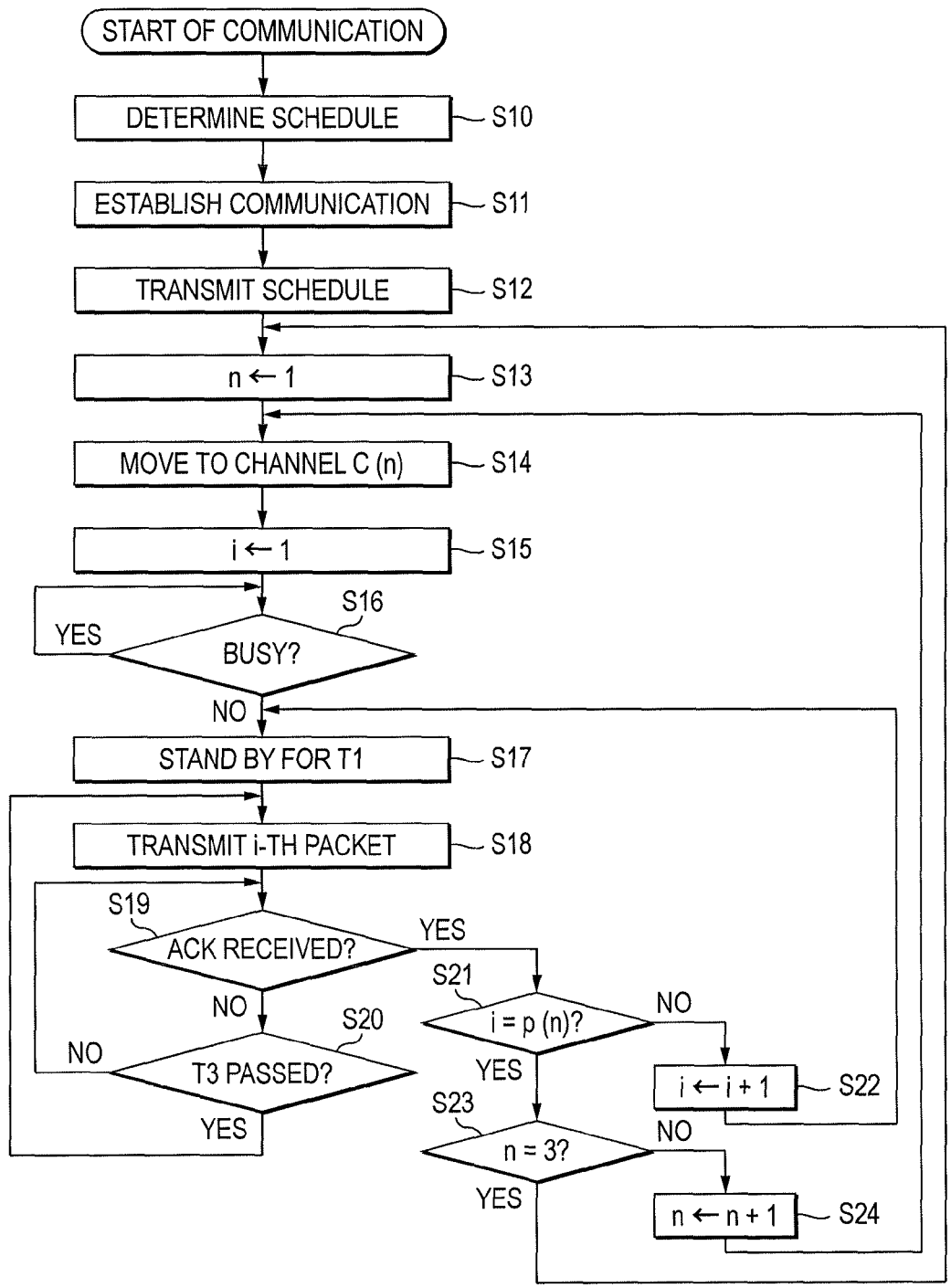
FIG. 6 is a flow chart showing the operation of the transmitter of the wireless audio system according to the second embodiment.

FIG. 6 is a flow chart showing a transmission processing operation for audio packets. This processing operation is carried out by the controller 12 of the transmitter 1. First, the controller carries out the schedule determination operation shown in FIG. 5(A) (at S10). After determining a schedule by carrying out the processing, the controller scans the channels and searches for a receiver and then establishes communication with the receiver 2 (at S11). When the communication with the receiver 2 is established (at S11), the controller transmits the schedule using the control channel (at S12). Hereafter, the controller transmits packets by performing the following processing.

The controller sets 1 in the counter n of an assigned channel (at S13). In the example shown in FIGS. 5(A) to 5(C), channel 13 is selected by this setting. The channel is moved to this selected assigned channel C(n) (at S14). Next, the controller sets 1 in the counter i for counting the number of packets to be transmitted at the selected assigned channel (at S15). Then, a judgment as to whether the channel is busy is made by performing carrier sense (at S16). The controller stands by at S16 until the busy state of the channel is ended; when the state is changed to idle (NO at S16), the controller stands by for only the stand-by time T1 (at S17) and transmits an i-th audio packet (at S18). It is assumed that the communication channel is subjected to carrier sense even during the stand-by time T1.

After the transmission of the audio packet is ended, the controller stands by for T3 until an acknowledgement response ACK is received from the receiver 2 (at S19 and S20). When the acknowledgement response ACK is received until T3 has passed (YES at S19), a judgment is made as to whether the packet number counter i is the number p(n) of packets to be transmitted at the assigned channel (at S21). In the case that the packet number counter i is less than p(n) (NO at S21), 1 is added to i (at S22), and the controller returns to S17 and transmits the next audio packet.

On the other hand, at S19 and S20, in the case that the acknowledgement response ACK is not received from the receiver 2 even after the stand-by time T3 has passed (YES at S20), the controller returns to S18 and retransmits the i-th audio packet.

In the case that the packet number counter i is p(n) at S21 (YES at S21), the controller determines that audio packet transmission at the assigned channel is ended, switches the assigned channel in synchronization with the switching in the receiver 2 and then resumes audio packet transmission at S15 and the subsequent steps.

Assigned channel switching is herein performed by the following procedure. First, the controller judges whether the counter n of the assigned channel is 3 (at S23). In the case that n is less than 3 (NO at S23), 1 is added to n (at S24), the controller returns to S14, moves the channel to the assigned channel C(n) designated by n (at S14). On the other hand, in the case that n is 3 (YES at S23), the controller returns to S13 and resets n to 1 (at S13), whereby the channel is moved to the assigned channel C(1) designated by n (=1) (at S14).

In this embodiment, three assigned channels are determined by performing channel scanning at the start of communication; however, the assigned channels may be re-examined in the middle of communication. Since an audio signal of approximately 1 ms can be transmitted using a packet of approximately 500 μs by the transmission method according to this embodiment as described above, if the transmission is performed with no error, a margin can be obtained in audio data on the side of the receiver 2. For this reason, it may be possible that the channel scanning shown in FIGS. 5(A) to 5(C) is performed again at an appropriate timing while the transmission is carried out and that the schedule is recreated. The above-mentioned appropriate timing is, for example, the timing when the transmission of a predetermined number of audio packets has been able to be performed at regular time intervals without retransmission or the timing when a message stating that the buffer is full has been received from the receiver 2. In the case that the channel scanning is carried out in the middle, it may be possible that the number of repetition times (100 times in the example in FIGS. 5(A) to 5(C)) is decreased to shorten the time therefor.

Third Embodiment

The third embodiment will be described below.

The 13 channels stipulated in the IEEE 802.11b will be herein described referring to FIGS. 3(A) and 3(B). The 13 channels are set at intervals of 5 MHz from 2412 MHz to 2472 MHz. In the case that these communication channels are used in a communication bandwidth of 20 MHz, as indicated by the solid lines in FIG. 3(A), four channels Ch1, Ch5, Ch9 and Ch13 can be used simultaneously without mutual interference. Furthermore, in the case that three channels are used simultaneously, various channel combinations are possible. In this embodiment, considerations have been taken so that the busy state due to audio packet transmission does not continue lengthily in any communication channel by performing audio packet transmission while the channel movement among three channels (Ch. A, B, C) capable of being used simultaneously (not interfering with one another) is performed sequentially. More specifically, as shown in FIG. 3(A), channel groups 1 to 5, each having three channels, are created, and audio packets are transmitted while channel movement is performed sequentially among the three channels (Ch. A, B, C) belonging to any one of the channel groups, and in the case that the error rate due to noise or the like is high, the channel group is changed. However, in the present invention, the number of channels constituting one channel group is not limited to 3.

The IEEE 802.11b also stipulates that communication is performed in a communication bandwidth of 22 MHz; in this case, three channels selected from among a plurality of combinations can be used simultaneously. For example, although the combination of three channels Ch1, Ch7 and Ch13 is indicated by the solid lines in FIG. 3(B), various combinations, such as the combination of Ch1, Ch6 and Ch11, other than the above-mentioned combination, are possible.

The audio packet transmission procedure in this wireless audio system is described referring to FIGS. 2(A) to 2(D). The transmitter 1 and the receiver 2 start audio packet transmission at the first channel (Ch. A) that belongs to the selected channel group. Then, the transmitter 1 and the receiver 2 transmit a predetermined number of audio packets at each channel while channel movement is performed sequentially among a plurality of channels (assigned channels Ch. A, B, C) as shown in FIG. 2(A).

The audio packet transmission procedure in each channel is described referring to FIG. 2(B). When starting audio packet transmission at an assigned channel (for example, Ch. A), the transmitter 1 first performs carrier sense for the channel. In the case that the channel has a state (BUSY) in which another communication apparatus is transmitting a signal, the transmitter monitors to check whether the state is changed to idle. When the state of the channel has been changed to idle or the state of the channel was idle as the result of the carrier sense, the transmitter stands by for a stand-by time T1 (for example, 3 μs) thereafter, and then starts audio packet transmission.

In the case that the above-mentioned other communication apparatus is a wireless LAN terminal conforming to the IEEE 802.11b, after the state of the channel has been changed to idle, the wireless LAN terminal stands by for 10 μs (SIFS: Short Inter Frame Space (refer to FIG. 2(D)) at the shortest and usually stands by for 50 μs or more (DIFS: DCF Inter Frame Space+back-off time) and then starts packet transmission. Hence, the transmitter 1 can certainly transmits an audio packet without allowing the wireless LAN terminal to start communication. This audio packet is received by the receiver 2.

When the transmission of the audio packet is ended, an acknowledgement response ACK is transmitted from the receiver 2. The stand-by time T2 from the completion of packet reception to the transmission of the acknowledgement response ACK at the receiver 2 is 2 μs, for example. Also in this case, in a similar way as described above, the receiver can transmit the acknowledgement response ACK earlier than the wireless LAN terminal.

Furthermore, as shown in FIG. 2(C), in the case that the transmitter 1 cannot receive the acknowledgement response ACK even after standing by for T3 (for example, 5 μs) after the transmission of the audio packet, the transmitter stores information stating that an error has occurred and retransmits the same audio packet. Since this stand-by time T3 is also shorter than the shortest packet space (SIFS) of the wireless LAN, the audio packet can be retransmitted without being interrupted by the wireless LAN terminal. The size of one audio packet is approximately 500 μs, and with this size, audio data of approximately 1 ms can be transmitted. Hence, even if retransmission occurs once in several times, buffer underflow does not occur on the side of the receiver 2. The reason why the fact that a packet transmission error has occurred is stored is to switch the assigned channel group when the error rate of any one of the channels exceeds a certain value and to determine the number of packets to be transmitted at each channel on the basis of the error rate of each channel. The details thereof will be described later.

The reason why the packet transmission can be started even though the stand-by time is short as described above is that the wireless audio system is not intended for long-distance communication, for example, for use in wireless LAN communication, but intended for packet transmission in a short distance of approximately 10 m. If the stand-by time is extended longer, it is possible to increase the distance margins among the devices of the wireless audio system and to increase the throughput margins of high-frequency circuits and processing sections as a matter of course.

In the description of this figure, the stand-by times T1, T2 and T3 are all made shorter than the SIFS (10 μs); however, even if the stand-by times T1, T2 and T3 are longer than the SIFS, if they are shorter than the shortest time (50 μs) of the DIFS, communication is possible without being interrupted by the other wireless LAN. In the case that the transmission of the acknowledgement response ACK (standing by for 10 μs) of the wireless LAN (IEEE 802.11b) is placed so as to have priority over the start of the audio packet transmission in the wireless audio system (T1>10 μs) as described above, the wireless audio system waits for the completion of a series of packet transmission steps for the packet transmission and the return of the acknowledgement response in the wireless LAN, and then starts audio packet transmission, whereby the start of audio packet transmission is delayed slightly; however, in consideration of the efficiency of the overall wireless communication environment, it may be said that higher efficiency is obtained in the case that priority is placed on the acknowledgement response ACK of the other wireless LAN terminal and that the series of packet transmission steps is completed as described above. Moreover, it may be possible to make transmission efficient by making only the stand-by time T1 immediately after Busy in FIG. 2(B) longer than the SIFS (10 μs) so that priority is given to the transmission of the acknowledgement response of the wireless LAN and by making the subsequent stand-by times T1, T2 and T3 shorter than the SIFS. In the case that the specifications of another type of wireless communication sharing a plurality of communication channels with the wireless communication according to the present invention conform to the IEEE 802.11b, the SIFS or the shortest time of DIFS can be applied to the shortest packet space according to the present invention.

In this procedure, when the transmitter 1 and the receiver 2 transmit audio packets, the audio packets are transmitted in priority over the packets of the wireless LAN at all times and sound loss does not occur; however, if this is performed continuously for a long time, the communication of the wireless LAN system cannot be performed at all at this channel (for example, Ch. A). Hence, after the transmission of a predetermined number (for example, three to six) of packets is completed, the channel is moved to the next channel (for example, Ch. B) and audio packet transmission is performed continuously using a similar procedure. Similarly, after the transmission of a predetermined number of audio packets is completed at this channel, the channel is moved further to the next channel (for example, Ch. C) and audio packet transmission is further performed continuously using a similar procedure. As a result, the influence on other communication, such as the wireless LAN, is minimized while audio packet transmission is performed continuously without intermission.

As described above, monitoring is performed at all times to judge whether audio packets have been transmitted normally (whether errors have occurred); in the case that the error rate of any one of the channels has reached a certain value (for example, 30%), the channel group is switched to avoid errors and to prevent sound loss beforehand. In the case that the error rate of only any one of the channels exceeds the certain value, the selection of all the three channels belonging to the channel group is cancelled, and the channel group is switched to another channel group. This is because, since each channel group is formed by combining a plurality of channels not interfering with one another, in the case that only the channel having a high error rate is switched, it may be possible in some cases that the band being used by the channel overlaps with the band being used by another channel and that a busy state occurs frequently at the channel, the frequency band of which is overlapped with the band being used; even if the error rate of the only one channel is high, the selection of the channel group including the channel is cancelled and the channel group is switched to another channel group, whereby communication can be performed uniformly at all the channels. This prevents the occurrence of a problem in which channels become unable to be used due to audio packet transmission, while avoiding transmission errors.

In the case that the error rate is not high to the extent that the channel group needs to be changed, the number of transmission packets to be allocated to each channel is changed depending on the error rate of each channel.

The error rate to be used for the above-mentioned monitoring may be an integrated error rate obtained after the current channel group was selected or may be an error rate for a certain period (for example, 1 to several seconds) in the past.

A method for determining the allocation of the number of packets to be transmitted at one time in each assigned channel will herein be described. The error frequency of packet transmission in each assigned channel has been stored. The error frequency having been stored is integrated at an appropriate timing to calculate an error rate. In other words, the ratio of the number of packet transmission times in each channel to the number of error occurrence times during the transmission is the error rate. On the basis of the error rate of each channel, the number of packets is allocated so that the number of packets to be transmitted at a channel having a low error rate is large and so that the number of packets to be transmitted at a channel having a high error rate is small.

Next, a method for determining the number of packets to be transmitted at each assigned channel will be described. In this embodiment, the number of packets is allocated to each assigned channel so that 15 packets can be transmitted while the three assigned channels are used sequentially. The numbers p(1), p(2) and p(3) of packets to be transmitted at the assigned channels C(1) (=Ch. A), C(2) (=Ch. B) and C(3) (=Ch. C) are, for example:

[Mathematical expression 2]

$$p(1) = \text{int}\left(\frac{r1}{r1+r2+r3} \times 6\right) + 3$$

$$p(2) = \text{int}\left(\frac{r2}{r1+r2+r3} \times 6\right) + 3$$

$$p(3) = \text{int}\left(\frac{r3}{r1+r2+r3} \times 6\right) + 3$$

calculated by the above mathematical expression: wherein $r1 = 30 - [\text{error rate (\%) of channel } C(1)]$ $r2 = 30 - [\text{error rate (\%) of channel } C(2)]$ $r3 = 30 - [\text{error rate (\%) of channel } C(3)]$ If the error rate at any one of the channels exceeds 30%, the channel group is changed, whereby r1, r2 and r3 do not become negative. Furthermore, the total of p(1), p(2) and p(3) becomes more than or less than 15 in some cases depending on int rounding processing; in such a case, adjustment should only be performed by increasing or decreasing the largest value p(n).

The allocation of the number of transmission packets depending on the communication quality of each assigned channel is determined by the above-mentioned processing. However, the method for determining the allocation of the number of transmission packets is not limited to this method.

Since the error rate is unknown at the beginning when the channel group is switched, an equal number of transmission packets should only be allocated to all the assigned channels.

This transmission packet number determination processing should only be performed at appropriate intervals. In the case of coping with instantaneous errors that occur frequently, the processing should only be performed at short intervals of approximately 1 to several seconds. Furthermore, in the case of coping with steady errors, the processing should only be performed at long intervals of approximately 1 to several minutes.

Referring again to FIG. 1, the configurations of the transmitter 1 and the receiver 2 will be described. The transmitter 1 is equipped with an audio input section 10 to which the mobile audio player 3 is connected, an A/D converter 11 for converting an audio signal input from the mobile audio player 3 into a digital signal, a controller 12 for controlling the operation of the transmitter 1, a communication circuit 13 for performing communication at various communication channels, and an antenna 14. The communication circuit 13 transmits an audio signal and receives an acknowledgement response ACK from the receiver 2. Furthermore, the communication circuit 13 performs intercommunication of control signals, such as the transmission/reception of the schedule, with the receiver 2. Moreover, the communication circuit 13 watches the communication channel and performs busy/idle check. The channel switching of the communication circuit 13 is performed under the control of the controller 12.

The receiver 2 has a built-in antenna 24, a communication circuit 20 for performing communication at respective communication channels, a controller 21 for controlling the operation of the receiver 2, a D/A converter 22 for converting a received digital audio signal into an analog signal, and an audio output section 23 for outputting an audio signal to the amp-equipped speaker 4. The communication circuit 20 receives a high-frequency signal transmitted from the transmitter 1, demodulates the audio signal and control signals, and transmits signals, such as an acknowledgement response ACK, input from the controller 21 to the transmitter 1. The audio signal demodulated to a base band digital signal by the communication circuit 20 is input to the D/A converter 22. In addition, the control signals demodulated by the communication circuit 20 are input to the controller 21. The D/A converter 22 converts the input digital audio signal into an analog audio signal and outputs the signal from the audio output section 23 to the amp-equipped speaker 4.

Figure 7:
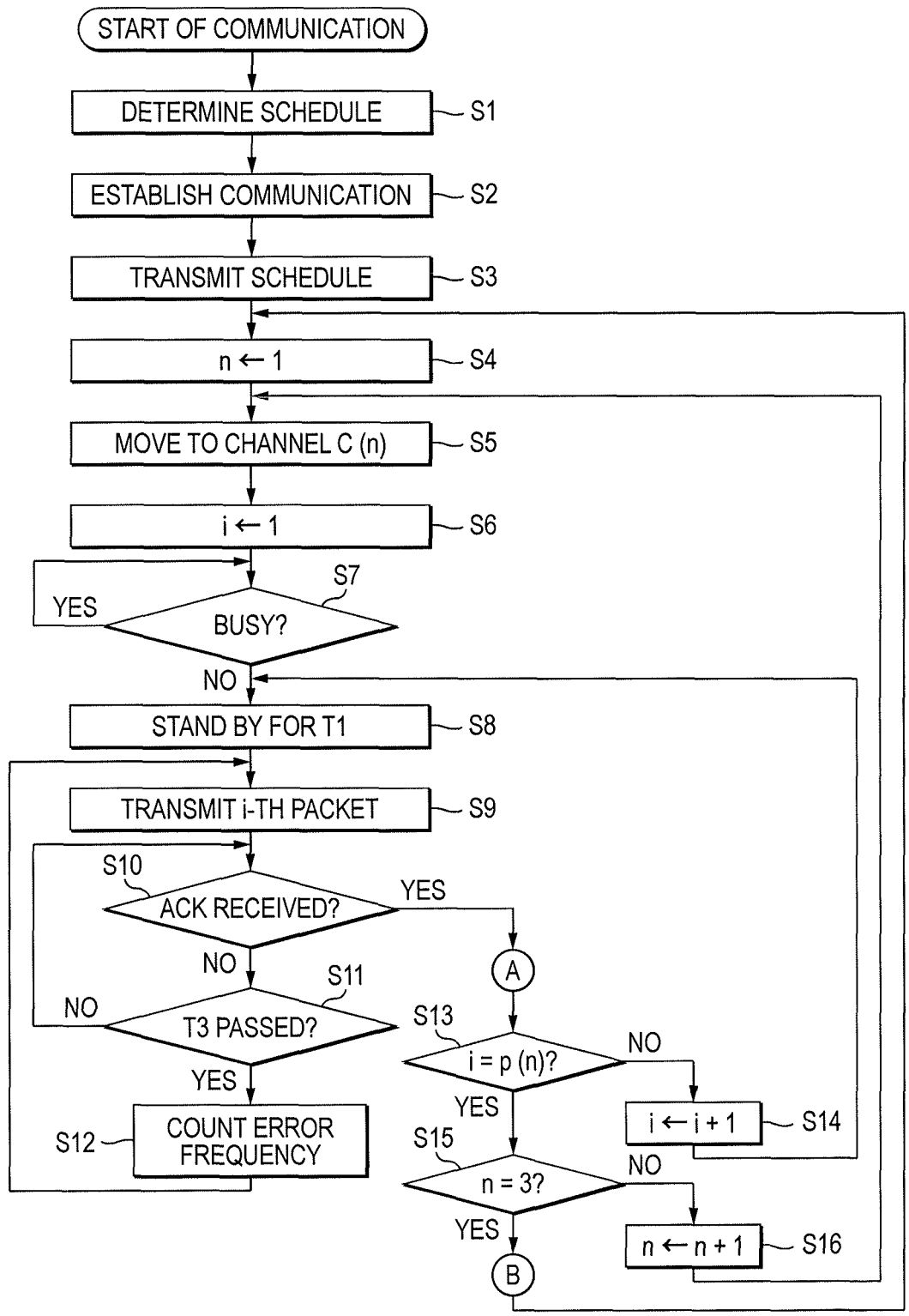
FIG. 7 is a flow chart showing the operation of the transmitter of the wireless audio system according to the third embodiment.

FIG. 7 is a flow chart showing a transmission processing operation for audio packets. This processing operation is carried out by the controller 12 of the transmitter 1. First, a schedule is determined (at S1). The schedule is formed of assigned channels C(1 to 3) and the numbers p(1 to 3) of transmission packets at the respective channels. The assigned channels are selected from the channel groups 1 to 5 shown in FIG. 3(A). It is assumed that an equal number of transmission packets, five, is allocated to the respective channels. After the schedule is determined, the controller scans the channels and searches for a receiver and then establishes communication with the receiver 2 (at S2). When the communication with the receiver 2 is established, the controller transmits the determined schedule using the control channel (at S3). Hereafter, the controller transmits packets by performing the following processing.

The controller sets 1 in the counter n of an assigned channel (at S4). The channel is moved to this selected assigned channel C(n) (at S5). Next, the controller sets 1 in the counter i for counting the number of packets to be transmitted at the selected assigned channel (at S6). Then, a judgment as to whether the channel is busy is made by performing carrier sense (at S7). In the case that the channel is busy (YES at S7), the controller stands by at S7 until the busy state is ended. When the state of the channel is changed to idle (NO at S7), the controller stands by for only the stand-by time T1 (at S8) and transmits an i-th audio packet (at S9). It is assumed that the communication channel is subjected to carrier sense even during the stand-by time T1.

After the transmission of the audio packet is ended, the controller stands by for T3 until an acknowledgement response ACK is received from the receiver 2 (at S10 and S11). When the acknowledgement response ACK is received until T3 has passed (YES at S10), a judgment is made as to whether the packet number counter i is the number p(n) of packets to be transmitted at the assigned channel (at S13). In the case that the packet number counter i is less than p(n) (NO at S13), 1 is added to i (at S14), and the controller returns to S8 and transmits the next audio packet.

On the other hand, at S10 and S11, in the case that the acknowledgement response ACK is not received from the receiver 2 even after the stand-by time T3 has passed (YES at S11), the error frequency is counted (at S12), the controller returns to S9 and retransmits the i-th audio packet.

In the case that the packet number counter i is p(n) at S13 (YES at S13), the controller determines that audio packet transmission at the assigned channel is ended, switches the assigned channel in synchronization with the switching in the receiver 2 and then resumes audio packet transmission at S5 and the subsequent steps.

Assigned channel switching is herein performed by the following procedure. First, the controller judges whether the counter n of the assigned channel is 3 (at S15). In the case that n is less than 3 (NO at S15), 1 is added to n (at S16), the controller returns to S5, moves the channel to the assigned channel C(n) designated by n (at S5). On the other hand, in the case that n is 3 (YES at S15), the controller returns to S4 and resets n to 1 (at S4), whereby the channel is moved to the assigned channel C(1) designated by n (=1) (at S5).

Figure 8:
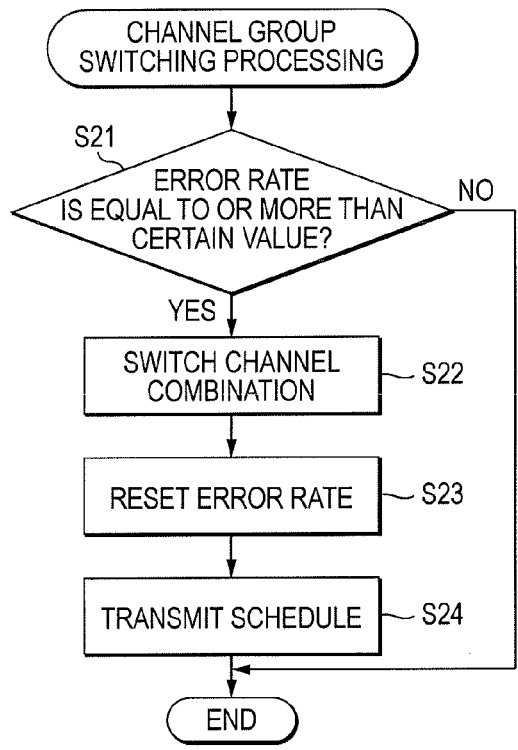
FIGS. 8(A), 8(B) and 8(C) are flow charts showing the operation of the transmitter of the wireless audio system according to the third embodiment.
Figure 8:
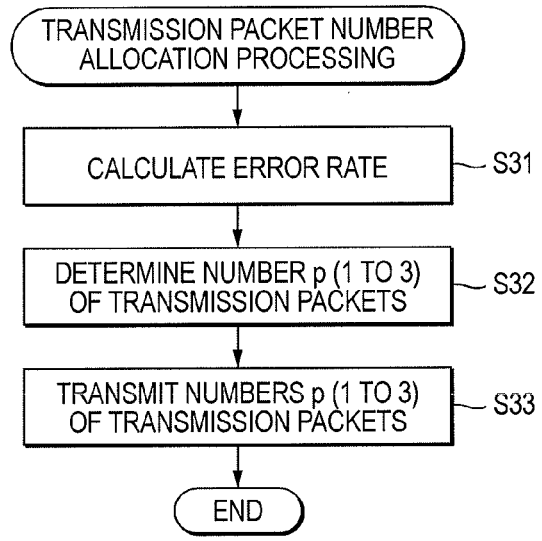
Figure 8:
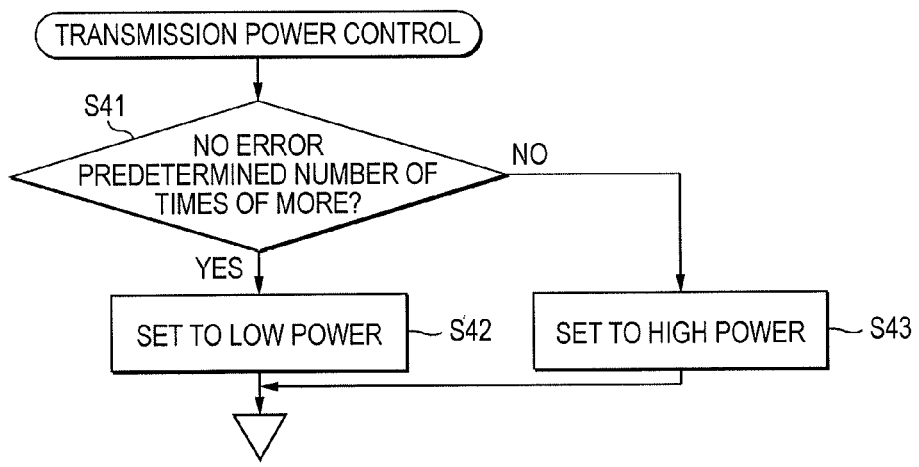

In the audio packet transmission processing shown in the flow chart of FIG. 7, transmission error countermeasure processing is carried out. FIGS. 8(A) to 8(C) are flow charts showing the transmission error countermeasure processing.

FIG. 8(A) is a flow chart showing channel group switching processing. It is preferable that this processing should be carried out while the controller advances from S10 to S13 (at the timing indicated by A in FIG. 7) or while the controller returns from S15 to S4 (at the timing indicated by B in FIG. 7). First, the controller judges at S21 whether the error rate at the channel is equal to or more than a certain value (for example, 30%). In the case that the error rate is not equal to or more than the certain value (NO at S21), the processing is ended without taking further steps.

In the case that the error rate is equal to or more than the certain value (YES at S21), the assigned channel group is changed to another channel group different from the current channel group (at S23). New channels to be combined may be those arranged in numerical sequence or those arranged at random. However, it is preferable that a channel group not including the channel whose error rate has exceeded the certain value should be selected. Then, the controller resets the error rate (at S23), transmits a new schedule to the receiver 2 (at S24), and advances to S4 in FIG. 7.

FIG. 8(B) is a flow chart showing transmission packet number allocation determining processing. This processing is carried out at an appropriate timing (for example, every 1 to several seconds or every 1 to several minutes) in the middle of the period during which the processing of S4 to S16 in FIG. 7 is carried out continuously and repeatedly. It is preferable that the processing should be carried out while the controller returns from S15 to S4 (at the timing indicated by B in FIG. 7).

The processing is used to reallocate the number of transmission packets to each assigned channel on the basis of the previous error rate of each assigned channel. First, the controller calculates an error rate by totalizing the error frequency of each assigned channel (at S31). Then, the controller calculates the numbers p(1 to 3) of transmission packets of the respective assigned channels on the basis of the result of the totalization (at S32). The method for calculating the error rate and the method for calculating the number of transmission packets are the same as described above. Then, the controller transmits the calculated numbers p (1 to 3) of transmission packets to the receiver 2 (at S33). The subsequent audio packet transmission/reception is performed on the basis of the numbers of packets. With this processing, it becomes possible to allocate the number of transmission packets depending on the state of real-time error occurrence in each assigned channel. Each time the processing is performed, it may be possible that the integrated value of the error frequency of each assigned channel is reset or the integration is performed continuously without resetting.

FIG. 8(C) is a flow chart showing transmission power control processing. As described above, the 2.4 GH band is used for various kinds of communication including 3G communication for mobile phone, cordless phone, etc. in addition to wireless LAN. Hence, in the case that the state of communication is favorable and that no error occurs, it is preferable that transmission output should be lowered to reduce influence on other wireless communication. Hence, when S9 in FIG. 7 is carried out, this processing may be performed to control transmission power. First, the controller judges whether the transmission of a predetermined number of packets (for example, 10 packets) has been performed with no error at this channel (at S41). In the case that the transmission of the predetermined number of packets has been performed without errors (YES at S41), the controller sets the transmission power to low power (at S42). Otherwise (NO at S41), the controller sets the transmission power to high power (at S43). After this setting, the packet transmission at S9 is performed.

Fourth Embodiment

The fourth embodiment will be described below.

The 13 channels stipulated in the IEEE 802.11b will be herein described referring to FIGS. 3(A) and 3(B). The 13 channels are set at intervals of 5 MHz from 2412 MHz to 2472 MHz. In the case that the communication bandwidth is 20 MHz, four channels Ch1, Ch5, Ch9 and Ch13 can be used simultaneously as indicated by the solid lines in FIG. 3(A). Furthermore, in the case that the transmission bandwidth is 22 MHz, three channels can be used simultaneously. Although the combination of three channels Ch1, Ch7 and Ch13 is indicated by the solid lines in FIG. 3(B), various combinations, such as the combination of Ch1, Ch6 and Ch11, other than the above-mentioned combination are possible. In the embodiment described below, a procedure for performing audio packet transmission while channel movement is performed sequentially among three channels (Ch. A, B, C) will be described. However, in the present invention, the number of channels to be assigned is not limited to 3.

The audio packet transmission procedure in this wireless audio system is described referring to FIGS. 2(A) to 2(D). The transmitter 1 and the receiver 2 start audio packet transmission at the first channel (Ch. A). Then, the transmitter 1 and the receiver 2 transmit a predetermined number of audio packets at each channel while channel movement is performed sequentially among a plurality of channels (assigned channels Ch. A, B, C) as shown in FIG. 2(A).

The audio packet transmission procedure in each channel is described referring to FIG. 2(B). When starting audio packet transmission at an assigned channel (for example, Ch. A), the transmitter 1 first performs carrier sense for the channel. In the case that the channel has a state (BUSY) in which another communication apparatus is transmitting a signal, the controller stores the state and monitors whether the state is changed to idle. When the state of the channel has been changed to idle or the state of the channel was idle as the result of the carrier sense, the transmitter stands by for a stand-by time T1 (for example, 3 µs) thereafter, and then starts audio packet transmission. The reason why the state of the channel being busy at the start of use of the channel is stored is to determine the number of packets to be transmitted at each channel on the basis of the busy rate of each channel. The details thereof will be described later.

In the case that the above-mentioned other communication apparatus is a wireless LAN terminal conforming to the IEEE 802.11b, after the state of the channel has been changed to idle, the wireless LAN terminal stands by for 10 µs (SIFS: Short Inter Frame Space (refer to FIG. 2(D)) at the shortest and usually stands by for 50 µs or more (DIFS: DCF Inter Frame Space+back-off time) and then starts packet transmission. Hence, the transmitter 1 can certainly transmits an audio packet without allowing the wireless LAN terminal to start communication. This audio packet is received by the receiver 2.

When the transmission of the audio packet is ended, an acknowledgement response ACK is transmitted from the receiver 2. The stand-by time T2 from the completion of packet reception to the transmission of the acknowledgement response ACK at the receiver 2 is 2 µs, for example. Also in this case, in a similar way as described above, the receiver can transmit the acknowledgement response ACK earlier than the wireless LAN terminal.

Furthermore, as shown in FIG. 2(C), in the case that the transmitter 1 cannot receive the acknowledgement response ACK even after standing by for T3 (for example, 5 µs) after the transmission of the audio packet, the transmitter 1 retransmits the same audio packet. Since this stand-by time T3 is also shorter than the shortest packet space (SIFS) of the wireless LAN, the audio packet can be retransmitted without being interrupted by the wireless LAN terminal. The size of one audio packet is approximately 500 µs, and with this size, audio data of approximately 1 ms can be transmitted. Hence, even if retransmission occurs once in several times, buffer underflow does not occur on the side of the receiver 2.

The reason why the packet transmission can be started even though the stand-by time is short as described above is that the wireless audio system is not intended for long-distance communication, for example, for use in wireless LAN communication, but intended for packet transmission in a short distance of approximately 10 m. If the stand-by time is extended longer, it is possible to increase the distance margins among the devices of the wireless audio system and to increase the throughput margins of high-frequency circuits and processing sections as a matter of course.

In the description of this figure, the stand-by times T1, T2 and T3 are all made shorter than the SIFS (10 µs); however, even if the stand-by times T1, T2 and T3 are longer than the SIFS, if they are shorter than the shortest time (50 µs) of the DIFS, communication is possible without being interrupted by the other wireless LAN. In the case that the transmission of the acknowledgement response ACK (standing by for 10 µs) of the wireless LAN (IEEE 802.11b) is placed so as to have priority over the start of the audio packet transmission in the wireless audio system (T1>10 µs) as described above, the wireless audio system waits for the completion of a series of packet transmission steps for the packet transmission and the return of the acknowledgement response in the wireless LAN, and then starts audio packet transmission, whereby the start of audio packet transmission is delayed slightly; however, in consideration of the efficiency of the overall wireless communication environment, it may be said that higher efficiency is obtained in the case that priority is placed on the acknowledgement response ACK of the other wireless LAN terminal and that the series of packet transmission steps is completed as described above. Moreover, it may be possible to make transmission efficient by making only the stand-by time T1 immediately after Busy in FIG. 2(B) longer than the SIFS (10 µs) so that priority is given to the transmission of the acknowledgement response of the wireless LAN and by making the subsequent stand-by times T1, T2 and T3 shorter than the SIFS. In the case that the specifications of another type of wireless communication sharing a plurality of communication channels with the wireless communication according to the present invention conform to the IEEE 802.11b, the SIFS or the shortest time of DIFS can be applied to the shortest packet space according to the present invention.

In this procedure, when the transmitter 1 and the receiver 2 transmit audio packets, the audio packets are transmitted in priority over the packets of the wireless LAN at all times and sound loss does not occur; however, if this is performed continuously for a long time, the communication of the wireless LAN system cannot be performed at all at this channel (for example, Ch. A). Hence, after the transmission of a predetermined number (for example, three to six) of packets is completed, the channel is moved to the next channel (for example, Ch. B) and audio packet transmission is performed continuously using a similar procedure. Similarly, after the transmission of a predetermined number of audio packets is completed at this channel, the channel is moved further to the next channel (for example, Ch. C) and audio packet transmission is further performed continuously using a similar procedure. As a result, the influence on the wireless LAN is minimized while audio packet transmission is performed continuously without intermission.

A method for determining the number of packets to be transmitted at one time in each assigned channel will herein be described. As described above, at the start of the transmission procedure at each assigned channel, information on whether the channel is busy (information stating that the channel is busy) has been stored. The busy state frequency having been stored is integrated at an appropriate timing to calculate a busy rate. In other words, the ratio of the number of usage times of each channel to the number of busy times is the busy rate. On the basis of the busy rate of each channel, the number of packets is allocated so that the number of packets to be transmitted at a channel having a low busy rate is large and so that the number of packets to be transmitted at a channel having a high busy rate is small.

Next, a method for determining the number of packets to be transmitted at each assigned channel will be described. In this embodiment, the number of packets is allocated to each assigned channel so that 15 packets can be transmitted while the three assigned channels are used sequentially. The numbers p(1), p(2) and p(3) of packets to be transmitted at the assigned channels C(1) (=Ch. A), C(2) (=Ch. B) and C(3) (=Ch. C) are, for example:

$$p(1) = \text{int}\left(\frac{r1}{r1+r2+r3} \times 6\right) + 3 \quad \text{[Mathematical expression 3]}$$

$$p(2) = \text{int}\left(\frac{r2}{r1+r2+r3} \times 6\right) + 3$$

$$p(3) = \text{int}\left(\frac{r3}{r1+r2+r3} \times 6\right) + 3$$

calculated by the above mathematical expression: wherein $r1$=[idle rate of channel $C(1)$]−50

$r2$=[idle rate of channel $C(2)$]−50

$r3$=[idle rate of channel $C(3)$]−50

The idle rate is calculated by "100−busy rate." When r1, r2 and r3 become negative, they should only be set to 0. Furthermore, the total of p(1), p(2) and p(3) becomes more than or less than 15 in some cases depending on int rounding processing; in such a case, adjustment should only be performed by increasing or decreasing the largest value p(n).

The allocation of the number of transmission packets depending on the congestion of the channel band of each assigned channel is determined by the above-mentioned processing. However, the method for determining the number of transmission packets is not limited to this method.

Since the integration of the busy state frequency is not performed at the beginning of the start of audio packet transmission, an equal number of transmission packets may be allocated to all the assigned channels, or for example, as shown below:

$$p(1)=7, p(2)=5, p(3)=3$$

the number of packets may be allocated fixedly in the order of the assigned channels.

This transmission packet number determination processing should only be performed at appropriate intervals. In the case of using channels instantaneously, the processing should only be performed at short intervals of approximately 1 to several seconds. Furthermore, in the case of using channels steadily, the processing should only be performed at long intervals of approximately 1 to several minutes.

Referring again to FIG. 1, the configurations of the transmitter 1 and the receiver 2 will be described. The transmitter 1 is equipped with an audio input section 10 to which the mobile audio player 3 is connected, an A/D converter 11 for converting an audio signal input from the mobile audio player 3 into a digital signal, a controller 12 for controlling the operation of the transmitter 1, a communication circuit 13 for performing communication at various communication channels, and an antenna 14. The communication circuit 13 transmits an audio signal and receives an acknowledgement response ACK from the receiver 2. Furthermore, the communication circuit 13 performs intercommunication of control signals, such as the transmission/reception of the schedule, with the receiver 2. Moreover, the communication circuit 13 watches the communication channel and performs busy/idle check. The channel switching of the communication circuit 13 is performed under the control of the controller 12.

The receiver 2 has a built-in antenna 24, a communication circuit 20 for performing communication at respective communication channels, a controller 21 for controlling the operation of the receiver 2, a D/A converter 22 for converting a received digital audio signal into an analog signal, and an audio output section 23 for outputting an audio signal to the amp-equipped speaker 4. The communication circuit 20 receives a high-frequency signal transmitted from the transmitter 1, demodulates the audio signal and control signals, and transmits signals, such as an acknowledgement response ACK, input from the controller 21 to the transmitter 1. The audio signal demodulated to a base band digital signal by the communication circuit 20 is input to the D/A converter 22. In addition, the control signals demodulated by the communication circuit 20 are input to the controller 21. The D/A converter 22 converts the input digital audio signal into an analog audio signal and outputs the signal from the audio output section 23 to the amp-equipped speaker 4.

Figure 9:
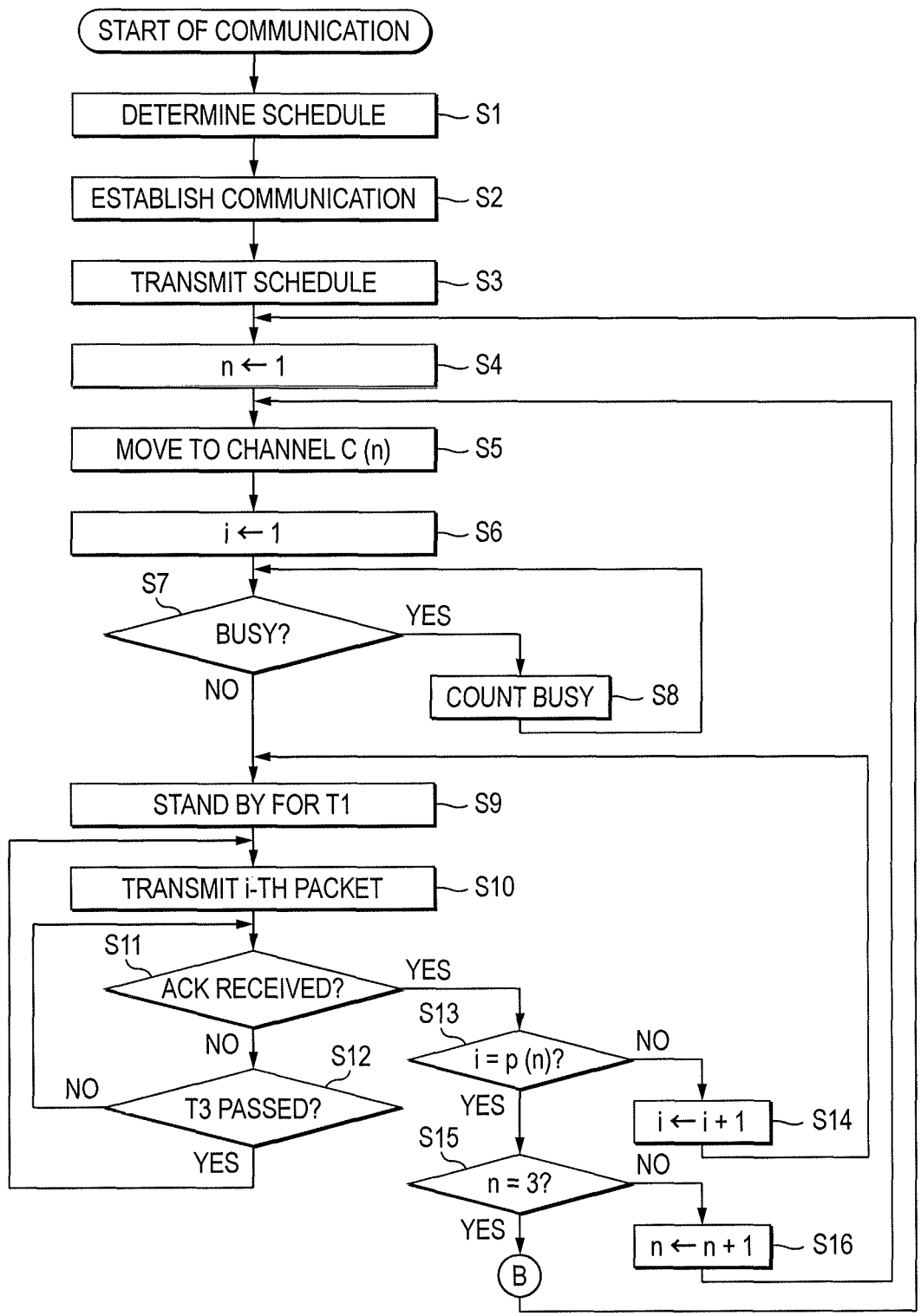
FIGS. 9(A) and 9(B) are flow charts showing the operation of the transmitter of the wireless audio system according to the fourth embodiment.
Figure 9:
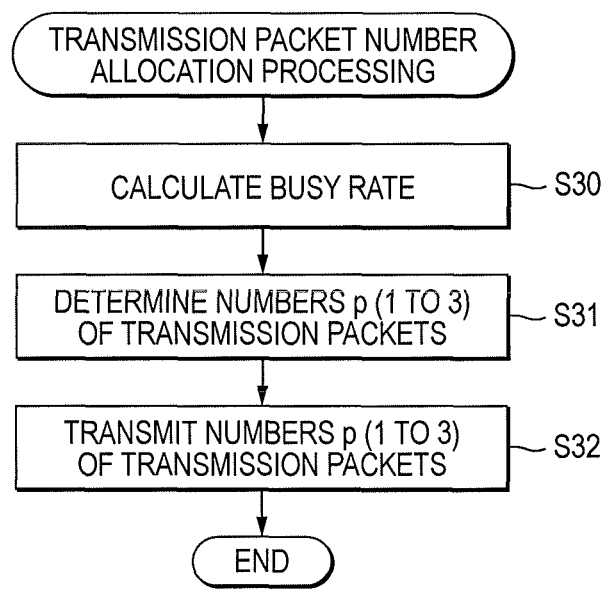

FIGS. 9(A) and 9(B) are flow charts showing a transmission processing operation for audio packets. This processing operation is carried out by the controller 12 of the transmitter 1. First, a schedule is determined (at S1). The schedule is formed of assigned channels C(1 to 3) and the numbers p(1 to 3) of transmission packets at the respective channels. As assigned channels, three channels disposed at appropriate intervals as shown in FIG. 3(B) should only be selected. After determining the schedule, the controller scans the channels and searches for a receiver and then establishes communication with the receiver 2 (at S2). When the communication with the receiver 2 is established, the controller transmits the determined schedule using the control channel (at S3). Hereafter, the controller transmits packets by performing the following processing.

The controller sets 1 in the counter n of an assigned channel (at S4). The channel is moved to this selected assigned channel C(n) (at S5). Next, the controller sets 1 in the counter i for counting the number of packets to be transmitted at the selected assigned channel (at S6). Then, a judgment as to whether the channel is busy is made by performing carrier sense (at S7). In the case that the channel is busy (YES at S7), the controller integrates the number of busy times (at S8), and stands by at S7 until the busy state is ended. The integration of the number of busy times at S8 is not performed during this stand-by time. When the state of the channel is changed to idle (NO at S7), the controller stands by for only the stand-by time T1 (at S9) and transmits an i-th audio packet (at S10). It is assumed that the communication channel is subjected to carrier sense even during the stand-by time T1.

After the transmission of the audio packet is ended, the controller stands by for T3 until an acknowledgement response ACK is received from the receiver 2 (at S11 and S12). When the acknowledgement response ACK is received until T3 has passed (YES at S11), a judgment is made as to whether the packet number counter i is the number p(n) of packets to be transmitted at the assigned channel (at S13). In the case that the packet number counter i is less than p(n) (NO at S13), 1 is added to i (at S14), and the controller returns to S9 and transmits the next audio packet.

On the other hand, at S11 and S12, in the case that the acknowledgement response ACK is not received from the receiver 2 even after the stand-by time T3 has passed (YES at S12), the controller returns to S10 and retransmits the i-th audio packet.

In the case that the packet number counter i is p(n) at S13 (YES at S13), the controller determines that audio packet transmission at the assigned channel is ended, switches the assigned channel in synchronization with the switching in the receiver 2 and then resumes audio packet transmission at S5 and the subsequent steps.

Assigned channel switching is herein performed by the following procedure. First, the controller judges whether the counter n of the assigned channel is 3 (at S15). In the case that n is less than 3 (NO at S15), 1 is added to n (at S16), the controller returns to S5, moves the channel to the assigned channel C(n) designated by n (at S5). On the other hand, in the case that n is 3 (YES at S15), the controller returns to S4 and resets n to 1 (at S4), whereby the channel is moved to the assigned channel C(1) designated by n (=1) (at S5).

FIG. 9(B) is a flow chart showing transmission packet number allocation determining processing. This processing is carried out at an appropriate timing (for example, every 1 to several seconds or every 1 to several minutes) in the middle of the period during which the processing of S4 to S16 in FIG. 9(A) is carried out continuously and repeatedly. It is preferable that the processing should be carried out while the controller returns from S15 to S4 (at the timing indicated by B in FIG. 9(A)).

The processing is used to reallocate the number of transmission packets to each assigned channel on the basis of the busy rate of each assigned channel. First, the controller calculates a busy rate by totalizing the busy state frequency of each assigned channel (at S30). Then, the controller calculates the numbers p(1 to 3) of transmission packets of the respective assigned channels on the basis of the result of the totalization (at S31). The method for calculating the busy rate and the method for calculating the number of transmission packets are the same as described above. Then, the controller transmits the calculated numbers p (1 to 3) of transmission packets to the receiver 2 (at S32). The subsequent audio packet transmission/reception is performed on the basis of the numbers of packets. With this processing, it becomes possible to allocate the number of transmission packets depending on the state of real-time congestion in each assigned channel. Each time the processing is performed, it may be possible that the integrated value of the busy state frequency of each assigned channel is reset or the integration is performed continuously without resetting.

In the above description, assigned channel selection is performed to appropriately select three channels being kept away from one another properly as shown in FIG. 3(B); however, it may also be possible that the usage state of each channel is checked before the start of communication, a channel that is less influenced even if packet transmission is performed preferentially is selected as an assigned channel, and audio packet transmission is performed using this assigned channel, thereby minimizing influence on other wireless communication.

A method for determining assigned channels and the number of packets to be transmitted at one time at each assigned channel (schedule) will be described below referring to FIGS. 5(A) to 5(C). In the following embodiments, a case in which the transmission bandwidth is 20 MHz and three assigned channels are selected is described.

FIG. 5(A) is a flow chart showing a schedule determination processing operation. This processing is carried out by the controller 12 described later. In this processing, the controller scans all the 13 channels in the 2.4 GHz band (at S51) and totalizes the usage state information of the respective channels according to the result of the scanning (at S52). Then, the controller determines channels (assigned channel) to be used for packet transmission and the number of packets to be transmitted at one time at each assigned channel on the basis of the result of the totalization (at S53).

A method for performing channel scanning and a method for totalizing the usage state information are described referring to FIGS. 5(B) and 5(C). The controller performs carrier sense by scanning channels 1 to 13 and detects whether each channel is busy (used) or idle (not used). This is repeated a plurality of times (for example, 100 times) at regular intervals (for example, every 10 ms). The time required for the scanning is 1 second in the case that the scanning is repeated 100 times in every 10 ms. The non-instantaneous average usage state of each channel can be detected by repeating the busy/idle scanning for all the channels. A large part of the time required for the channel scanning is spent for the receiver channel switching (received frequency switching) of the communication circuit 13. If a receiver capable of performing high-speed channel switching can be realized, the time for the above-mentioned channel scanning can be shortened significantly.

After the plurality of times of the scanning, the number of busy times (busy state frequency) is totalized for each channel. FIG. 5(C) is a graph showing the distribution of the busy state frequency. In the case that the scanning is repeated 100 times, the busy state frequency (number of times) represents a busy rate (%). In the example shown in the figure, communication is performed using channel 1 and channel 6, and the busy rate of channel 6 has a high rate of approximately 60%. The channel band for this communication ranges from channel 5 to channel 7. Furthermore, the busy rate of channel 1 is approximately 20%, and the channel band for this communication ranges from channel 1 to channel 2.

In addition, the channel band for packet transmission is applied to this frequency distribution graph and three channels having less influence are determined as assigned channels. In the example of FIG. 5(C), channel 13 and channel 9 having almost no influence on the channels being used at present are determined as first and second assigned channels C(1) and C(2), and the channel 1 having no influence on channel 6 being used at the high busy rate and having influence on channel 1 being used at the low busy rate is determined as a third assigned channel C(3).

In the case that the assigned channels have been determined as described above, the number of packets to be transmitted may be determined beforehand on the basis of the busy rate of each assigned channel. In this case, the method for calculating the numbers p(1), p(2) and p(3) of packets to be transmitted may be the same as that used at S31 in FIG. 9(B).

In the above description, a method for determining three assigned channels by performing channel scanning at the start of communication has been described; however, the assigned channel may be re-examined in the middle of communication. Since an audio signal of approximately 1 ms can be transmitted using a packet of approximately 500 μs by the transmission method according to this embodiment as described above, if the transmission is performed with no error, a margin can be obtained in audio data on the side of the receiver 2. For this reason, it may be possible that the channel scanning shown in FIGS. 5(A) to 5(C) is performed again at an appropriate timing while the transmission is carried out and that the schedule is recreated. The above-mentioned appropriate timing is, for example, the timing when the transmission of a predetermined number of audio packets has been able to be performed at regular time intervals without retransmission or the timing when a message stating that the buffer is full has been received from the receiver 2. In the case that the channel scanning is carried out in the middle, it may be possible that the number of repetition times (100 times in the example in FIGS. 5(A) to 5(C)) is decreased to shorten the time therefor.

In the above-mentioned first to fourth embodiments, the mobile audio player 3 is used as an apparatus for reproducing audio signals; however, the reproducing apparatus is not limited to a mobile apparatus.

With an aspect according to the present invention, audio packets are transmitted/received in priority over other wireless communication, such as wireless LAN, while channel movement is performed among a plurality of channels; hence, the audio packets can be transmitted without intermission and the influence on a wireless communication system that uses the respective channels can be minimized.

With another aspect according to the present invention, audio packets are transmitted/received in priority over other wireless communication, such as wireless LAN, while channel movement is performed among a plurality of assigned channels, and the combination (channel group) of the assigned channels and the number of transmission packets is changed depending on error rates; hence, the influence on a wireless communication system that uses the respective channels can be minimized and audio packet transmission having high resistance to errors can be realized.

This application is based upon Japanese Patent Application No. 2010-282897 filed on Dec. 20, 2010, Japanese Patent Application No. 2011-053116 filed on Mar. 10, 2011, Japanese Patent Application No. 2011-057065 filed on Mar. 15, 2011, and Japanese Patent Application No. 2011-057066 filed on Mar. 15, 2011, the entire contents of which are incorporated herein by reference.

DESCRIPTION OF REFERENCE NUMERALS AND SIGNS 1 transmitter
12 controller
13 communication circuit
2 receiver
21 controller

The invention claimed is:

1. A wireless audio transmission method for transmitting audio packets through first wireless communication between a transmitter and a receiver using a plurality of channels shared with second wireless communication, the wireless audio transmission method comprising:
(step 1) by the transmitter and the receiver, selecting one channel;
(step 2) by the transmitter, performing carrier sense for the selected channel and detecting that the selected channel has become idle, and then;
(step 3) by the transmitter, standing by for only a first stand-by time shorter than a shortest packet space stipulated in a specification of the second wireless communication, and transmitting an audio packet;
(step 4) by the receiver, after completing reception of the audio packet, standing by for only a second stand-by time shorter than the shortest packet space, and transmitting a response signal;
(step 5) after receiving the response signal by the transmitter, when transmission/reception of a predetermined number of audio packets is not completed, returning to the step 3 to transmit a next audio packet; and
(step 6) when the transmission/reception of the predetermined number of audio packets is completed, by the transmitter and the receiver, switching the selected channel and selecting another channel, and returning to the step 2;
wherein the predetermined number for each assigned channel is further determined at the step 1 based on the usage state of each of the channels.

2. The wireless audio transmission method according to claim 1, wherein
the plurality of channels shared with the second wireless communication are a plurality of channels stipulated in IEEE 802.11b, and
the switching of the selected channel is performed among channels capable of being used simultaneously and having communication frequency bands not overlapped with one another in the plurality of channels.

3. A wireless audio transmission method for transmitting audio packets through first wireless communication between a transmitter and a receiver using a plurality of channels shared with second wireless communication, the wireless audio transmission method comprising:
(step 1) by the transmitter and the receiver, selecting one channel;
(step 2) by the transmitter, performing carrier sense for the selected channel and detecting that the selected channel has become idle, and then;
(step 3) by the transmitter, standing by for only a first stand-by time longer than SIFS which is a packet space for acknowledgement response stipulated in a specification of the second wireless communication and shorter than DIFS which is a shortest time of an ordinary packet space stipulated in the specification of the second wireless communication, and transmitting an audio packet;
(step 4) by the receiver, after completing reception of the audio packet, standing by for only a second stand-by time shorter than the SIFS, and transmitting a response signal;
(step 5) by the transmitter, after receiving the response signal, when transmission/reception of a predetermined number of audio packets is not completed, standing by for only a third stand-by time shorter than the SIFS, and transmitting an audio packet, and then returning to the step 4; and
(step 6) when the transmission/reception of the predetermined number of audio packets is completed, by the transmitter and the receiver, switching the selected channel and selecting another channel, and returning to the step 2.

4. The wireless audio transmission method according to claim 3, wherein
the plurality of channels shared with the second wireless communication are a plurality of channels stipulated in IEEE 802.11b, and
the switching of the selected channel is performed among channels capable of being used simultaneously and having communication frequency bands not overlapped with one another in the plurality of channels.

5. A wireless audio transmission method for transmitting audio packets through first wireless communication between a transmitter and a receiver using a plurality of channels shared with second wireless communication, the wireless audio transmission method comprising:
(step 1) by the transmitter, detecting usage state of each channel by scanning the plurality of channels and determining a plurality of assigned channels based on the usage state of each channel;
(step 2) by the transmitter, notifying the receiver of the determined plurality of assigned channels;
(step 3) by the transmitter and the receiver, selecting one assigned channel from among the plurality of assigned channels;
(step 4) by the transmitter, performing carrier sense for the selected assigned channel and detecting that the selected assigned channel has become idle, and then;
(step 5) by the transmitter, standing by for only a first stand-by time shorter than a shortest packet space stipulated in a specification of the second wireless communication, and transmitting an audio packet;
(step 6) by the receiver, after completing reception of the audio packet, standing by for only a second stand-by time shorter than the shortest packet space, and transmitting a response signal;
(step 7) by the transmitter, after completing transmission of the audio packet, when receiving no response signal from the receiver even after standing by for only a third stand-by time longer than the second stand-by time and shorter than the shortest packet space, retransmitting the audio packet;
(step 8) after receiving the response signal by the transmitter, when transmission/reception of a predetermined number of audio packets is not completed, returning to the step 5 to transmit a next audio packet; and
(step 9) when the transmission/reception of the predetermined number of audio packets is completed, by the transmitter and the receiver, switching the selected assigned channel and selecting another assigned channel from among the plurality of assigned channels, and returning to the step 4;

wherein the predetermined number for each assigned channel is further determined at the step 1 based on the usage state of each of the channels.

6. The wireless audio transmission method according to claim 5, wherein the steps 1 to 3 are carried out again at a predetermined timing while the steps 4 to 9 are carried out repeatedly.

7. A wireless audio transmission method for transmitting audio packets through first wireless communication between a transmitter and a receiver using a plurality of channels shared with second wireless communication, the wireless audio transmission method comprising:
- (step 1) by the transmitter, detecting usage state of each channel by scanning the plurality of channels and determining a plurality of assigned channels based on the usage state of each channel;
- (step 2) by the transmitter, notifying the receiver of the determined plurality of assigned channels,
- (step 3) by the transmitter and the receiver, selecting one assigned channel from among the plurality of assigned channels;
- (step 4) by the transmitter, performing carrier sense for the selected assigned channel and detecting that the selected assigned channel has become idle, and then;
- (step 5) by the transmitter, standing by for only a first stand-by time longer than SIFS which is a packet space for acknowledgement response stipulated in a specification of the second wireless communication and shorter than DIFS which is a shortest time of an ordinary packet space stipulated in the specification of the second wireless communication, and transmitting an audio packet;
- (step 6) by the receiver, after completing reception of the audio packet, standing by for only a second stand-by time shorter than the SIFS, and transmitting a response signal;
- (step 7) by the transmitter, after completing transmission of the audio packet, when receiving no response signal from the receiver even after standing by for only a third stand-by time longer than the second stand-by time and shorter than the SIFS, retransmitting the audio packet;
- (step 8) by the transmitter, after receiving the response signal, when transmission/reception of a predetermined number of audio packets is not completed, standing by for only a fourth stand-by time shorter than the SIFS, transmitting an audio packet, and then returning to the step 6; and
- (step 9) when the transmission/reception of the predetermined number of audio packets is completed, by the transmitter and the receiver, switching the selected assigned channel and selecting another assigned channel from among the plurality of assigned channels, and returning to the step 4.

8. The wireless audio transmission method according to claim 7, wherein the predetermined number for each assigned channel is further determined at the step 1 based on the usage state of each of the channels.

9. The wireless audio transmission method according to claim 7, wherein the steps 1 to 3 are carried out again at a predetermined timing while the steps 4 to 9 are carried out repeatedly.

10. A wireless audio transmission method for transmitting audio packets through first wireless communication between a transmitter and a receiver using a plurality of channels shared with second wireless communication, the wireless audio transmission method comprising:
- (step 1) by the transmitter, selecting one from among a plurality of channel groups each of which includes at least two channels;
- (step 2) by the transmitter, notifying the receiver of the selected channel group;
- (step 3) by the transmitter and the receiver, selecting one channel from the selected channel group;
- (step 4) by the transmitter, performing carrier sense for the selected channel and detecting that the selected channel has become idle, and then;
- (step 5) by the transmitter, standing by for only a first stand-by time shorter than a shortest packet space stipulated in a specification of the second wireless communication, and transmitting an audio packet;
- (step 6) by the receiver, after completing reception of the audio packet, standing by for only a second stand-by time shorter than the shortest packet space, and transmitting a response signal;
- (step 7) by the transmitter, after completing transmission of the audio packet, when receiving no response signal from the receiver even after standing by for only a third stand-by time longer than the second stand-by time and shorter than the shortest packet space, storing information stating that an error has occurred, and retransmitting the audio packet;
- (step 8) after receiving the response signal by the transmitter, when transmission/reception of a predetermined number of audio packets is not completed, returning to the step 5 to transmit a next audio packet;
- (step 9) when the transmission/reception of the predetermined number of audio packets is completed, by the transmitter and the receiver, switching the selected channel and selecting another channel from the selected channel group, and returning to the step 4; and
- (step 10) monitoring the error, and, when an error rate of a channel included in the selected channel group exceeds a predetermined value, changing the selected channel group and selecting another channel group, and returning to the step 2.

11. The wireless audio transmission method according to claim 10, wherein the at least two channels included respectively in the plurality of channel groups have frequency bands not overlapped with each other during audio packet transmission.

12. The wireless audio transmission method according to claim 10, wherein another channel group to be selected at the step 10 is a channel group not including a channel an error rate of which exceeds a predetermined value.

13. The wireless audio transmission method according to claim 10, wherein in a case that the transmitter transmits audio packets continuously a predetermined number of times without an error at the selected channel at the step 5, audio packet transmission is performed while electric power is lowered.

14. The wireless audio transmission method according to claim 10, wherein
the first stand-by time is longer than Short Inter Frame Space (SIFS) stipulated in IEEE 802.11b and shorter than Distributed Inter Frame Space (DIFS) stipulated in the IEEE 802.11b, and
the second stand-by time is shorter than the SIFS, and the third stand-by time is longer than the second stand-by time and shorter than the SIFS.

15. A wireless audio transmission method for transmitting audio packets through first wireless communication between a transmitter and a receiver using a plurality of channels shared with second wireless communication, the wireless audio transmission method comprising:

(step 1) by the transmitter and the receiver, selecting one channel from among the plurality of channels;

(step 2) by the transmitter, performing carrier sense for the selected channel and detecting that the selected channel has become idle, and then;

(step 3) by the transmitter, standing by for only a first stand-by time shorter than a shortest packet space stipulated in a specification of the second wireless communication, and transmitting an audio packet;

(step 4) by the receiver, after completing reception of the audio packet, standing by for only a second stand-by time shorter than the shortest packet space, and transmitting a response signal;

(step 5) by the transmitter, after completing transmission of the audio packet, when receiving no response signal from the receiver even after standing by for only a third stand-by time longer than the second stand-by time and shorter than the shortest packet space, storing information stating that an error has occurred, and retransmitting the audio packet;

(step 6) after receiving the response signal by the transmitter, when transmission/reception of a predetermined number of audio packets is not completed, returning to the step 3 to transmit a next audio packet;

(step 7) when the transmission/reception of the predetermined number of audio packets is completed, by the transmitter and the receiver, switching the selected channel and selecting another channel from among the plurality of channels, and returning to the step 2; and (step 8) determining the predetermined number at each channel based on an error rate of each channel of the plurality of channels at a predetermined timing while carrying out the steps 2 to 7 repeatedly.

16. The wireless audio transmission method according to claim 15, wherein in a case that the transmitter transmits audio packets continuously a predetermined number of times without an error at the selected channel at the step 3, audio packet transmission is performed while electric power is lowered.

17. A wireless audio transmission method for transmitting audio packets through first wireless communication between a transmitter and a receiver using a plurality of channels shared with second wireless communication, the wireless audio transmission method comprising:

(step 1) by the transmitter and the receiver, selecting one assigned channel from among a plurality of assigned channels;

(step 2) by the transmitter, performing carrier sense for the selected assigned channel, storing a busy rate of the selected assigned channel, and detecting that the selected assigned channel has become idle, and then;

(step 3) by the transmitter, standing by for only a first stand-by time shorter than a shortest packet space stipulated in a specification of the second wireless communication, and transmitting an audio packet;

(step 4) by the receiver, after completing reception of the audio packet, standing by for only a second stand-by time shorter than the shortest packet space, and transmitting a response signal;

(step 5) by the transmitter, after completing transmission of the audio packet, when receiving no response signal from the receiver even after standing by for only a third stand-by time longer than the second stand-by time and shorter than the shortest packet space, retransmitting the audio packet;

(step 6) after receiving the response signal by the transmitter, when transmission/reception of a predetermined number of audio packets is not completed, returning to the step 3 to transmit a next audio packet;

(step 7) when the transmission/reception of the predetermined number of audio packets is completed, by the transmitter and the receiver, switching the selected assigned channel and selecting another assigned channel from among the plurality of assigned channels, and returning to the step 2; and (step 8) determining the predetermined number at each assigned channel based on the stored busy rate of each assigned channel at a predetermined timing while carrying out the steps 2 to 7 repeatedly;

wherein the predetermined number for each assigned channel is further determined at the step 1 based on the usage state of each of the channels.

18. The wireless audio transmission method according to claim 17, wherein before the step 1 is carried out, the transmitter detects usage state of each channel by scanning the plurality of channels, and determines the plurality of assigned channels based on the usage state of each channel, and the transmitter notifies the receiver of the determined plurality of assigned channels.

19. A wireless audio transmission method for transmitting audio packets through first wireless communication between a transmitter and a receiver using a plurality of channels shared with second wireless communication, the wireless audio transmission method comprising:

(step 1) by the transmitter and the receiver, selecting one assigned channel from among a plurality of assigned channels;

(step 2) by the transmitter, performing carrier sense for the selected assigned channel, storing a busy rate of the selected assigned channel, and detecting that the selected assigned channel has become idle, and then;

(step 3) by the transmitter, standing by for only a first stand-by time longer than SIFS which is a packet space for acknowledgement response stipulated in a specification of the second wireless communication and shorter than DIFS which is a shortest time of an ordinary packet space stipulated in the specification of the second wireless communication, and transmitting an audio packet;

(step 4) by the receiver, after completing reception of the audio packet, standing by for only a second stand-by time shorter than the SIFS, and transmitting a response signal;

(step 5) by the transmitter, after completing transmission of the audio packet, when receiving no response signal from the receiver even after standing by for only a third stand-by time longer than the second stand-by time and shorter than the SIFS, retransmitting the audio packet;

(step 6) after receiving the response signal by the transmitter, when transmission/reception of a predetermined number of audio packets is not completed, standing by for only a fourth stand-by time shorter than the SIFS, and transmitting an audio packet, and then returning to the step 4;

(step 7) when the transmission/reception of the predetermined number of audio packets is completed, by the transmitter and the receiver, switching the selected assigned channel and selecting another assigned channel from among the plurality of assigned channels, and returning to the step 2; and (step 8) determining the predetermined number at each assigned channel based on the stored busy rate of each assigned channel at a predetermined timing while carrying out the steps 2 to 7 repeatedly.

20. The wireless audio transmission method according to claim 19, wherein before the step 1 is carried out, the transmitter detects usage state of each channel by scanning the plurality of channels, and determines the plurality of assigned channels based on the usage state of each channel, and the transmitter notifies the receiver of the determined plurality of assigned channels.

* * * * *